(12) United States Patent
Murai et al.

(10) Patent No.: US 6,575,039 B2
(45) Date of Patent: Jun. 10, 2003

(54) COMBUSTION PRESSURE SENSOR ASSEMBLY

(75) Inventors: Hiroyuki Murai, Anjo (JP); Kouichi Hattori, Ichinomiya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/742,000

(22) Filed: Dec. 22, 2000

(65) Prior Publication Data

US 2001/0008090 A1 Jul. 19, 2001

(30) Foreign Application Priority Data

Dec. 24, 1999 (JP) .......................................... 11-366457

(51) Int. Cl.⁷ ................................................ G01L 7/00
(52) U.S. Cl. .......................................... 73/756; 73/116
(58) Field of Search ........................ 73/756, 116, 119 R

(56) References Cited

U.S. PATENT DOCUMENTS 4,430,899 A    2/1984   Wessel

FOREIGN PATENT DOCUMENTS

| DE | 15 90 923 | 2/1971 |
|----|-----------|--------|
| EP | 0 013 702 | 8/1980 |
| EP | 0184666   | 6/1986 |
| EP | 0 834 699 | 4/1998 |
| JP | 59 060237 | 4/1984 |
| JP | 59 145927 | 8/1984 |
| JP | 60 133338 | 7/1985 |
| JP | 07-139736 | 5/1996 |
| JP | 8-232823  | 9/1996 |
| JP | 8-232825  | 9/1996 |
| JP | 09-072811 | * 3/1997 |

* cited by examiner

*Primary Examiner*—Hezron Williams
*Assistant Examiner*—Corey D. Mack

(57) ABSTRACT

A glow plug with combustion pressure sensor having a plug body having a screw portion on the outer peripheral surface that is inserted into a screw hole of an engine head and screw-connected to it, a combustion pressure sensor fixed to the plug body to which the plug body is inserted, and a lead wire for leading out the sensor signal connected to the sensor, wherein the outside diameter of a hexagonal portion used for screw connection between the plug body and the screw hole out of the plug body is smaller than the inside diameter of a through hole of the combustion pressure sensor so that the plug body can be inserted into the combustion pressure sensor from the hexagonal portion end.

14 Claims, 15 Drawing Sheets

FIG. 4A
PRIOR ART
FIG. 4B
PRIOR ART
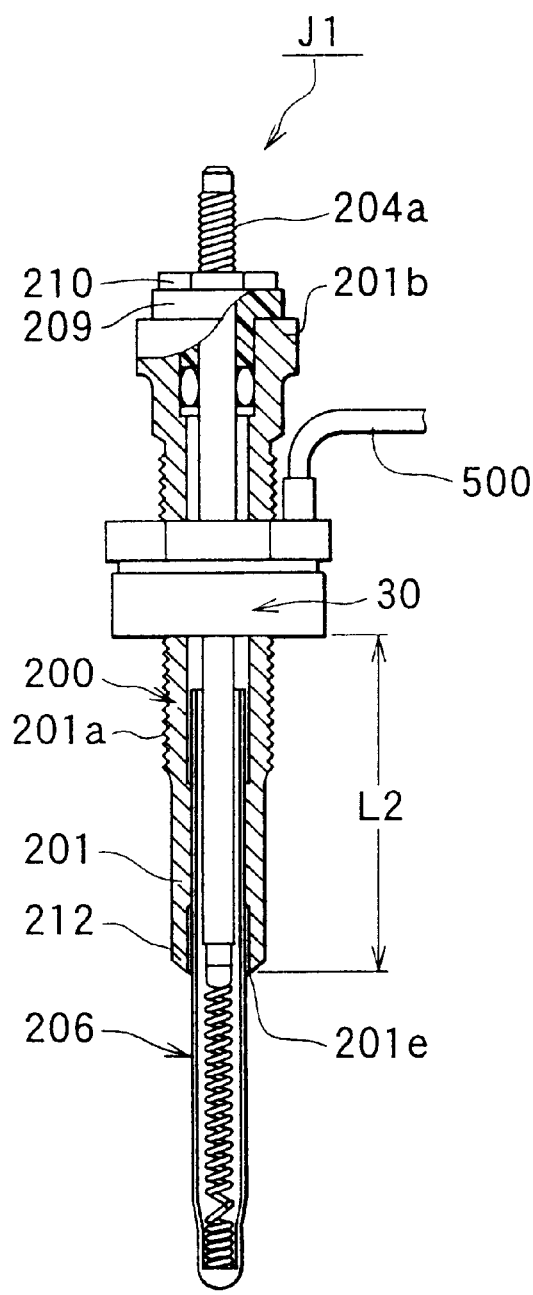
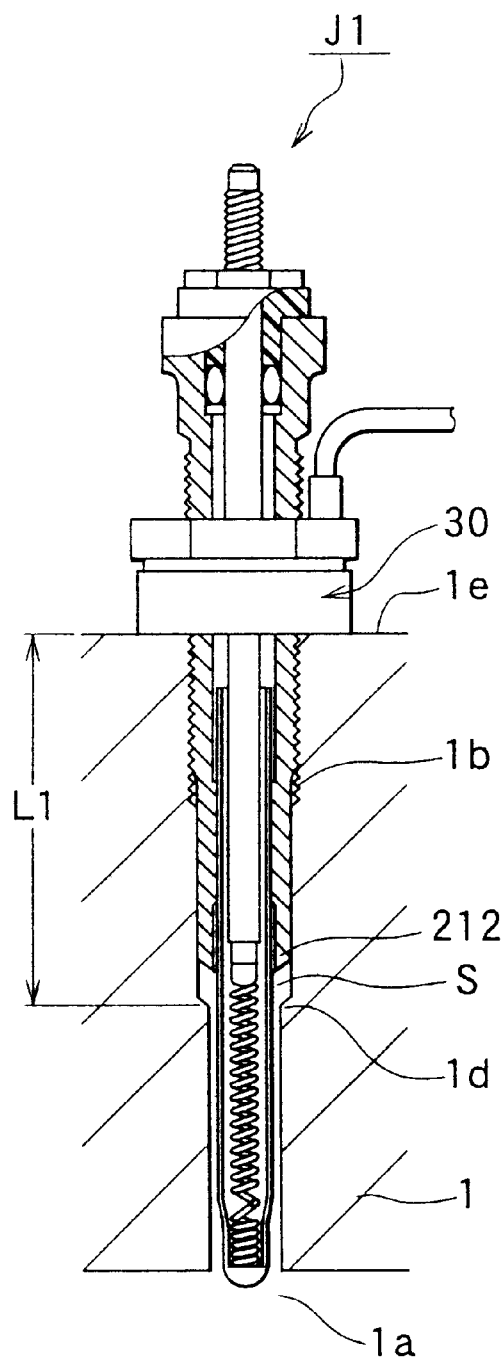

US 6,575,039 B2

COMBUSTION PRESSURE SENSOR ASSEMBLY

CROSS-REFERENCE TO RELATED APPLICATION

The present invention is related to Japanese patent application No. Hei. 11-366457, filed Dec. 24, 1999; the contents of which are incorporated herein by reference.

FIELD OF THE INVENTION

The present invention relates to a combustion pressure sensor, and more particularly, to a combustion pressure sensor screwed into a tapped hole formed on an engine.

BACKGROUND OF THE INVENTNION

In JP-A No. H7-139736 a glow plug with a combustion pressure sensor used as a starting auxiliary device for an engine such as a diesel engine or the like is described. A general structural schematic cross sectional view of a conventional glow plug with combustion pressure sensor is shown in FIG. 14A. FIG. 14B shows the outer peripheral shape of the top view of the hexagonal portion 201b of the housing 201 shown in FIG. 14A for comparison with a combustion pressure sensor 30.

A glow plug with combustion pressure sensor J1 is provided with a plug body (unique to the glow plug) 200 that holds a heater 206 (heated when a current is supplied in the housing 201) a combustion pressure sensor (pressure sensor) 30 fixed to the plug body 200 for detecting a combustion pressure in an engine based on combustion pressure force exerted on the plug body 200, and a lead wire 500 outputting a signal from the combustion pressure sensor 30.

One end of the plug body 200 is inserted into a tapped hole 1b formed on an engine head 1 of a diesel engine. The plug body 200 is screw-fixed to the engine head 1. For the screw fixing, a fixing screw 201a formed on the outer peripheral surface of the housing 201 of the plug body 200 is screwed by turning the plug body 200 round the axis by means of the hexagonal portion 201b formed on the other end of the housing 201.

The spark plug function of the glow plug J1 will be described herein under. A voltage is applied to a middle shaft 204 from a power source though a connecting bar 2, and earthed to the engine head 1 through a heater coil 203, a sheathed tube 202, and the housing 201. Thereby, the heater 206 comprising the heater coil 203 and sheathed tube 202 is heated for auxiliary ignition starting of the diesel engine.

The combustion pressure sensor 30 is a ring-shaped component having a through hole 30a and an inside screw portion 311. The plug body 200 is inserted into the through hole 30a, and the combustion sensor 30 is fixed to the fixing screw 201a of the plug body 200 by means of screw fixing. Furthermore, the one end of the lead wire 500 is connected electrically to the top end surface of the combustion pressure sensor 30 with interposition of a fixing metal member 333. The other end of the lead wire 500 is provided with a connector 400 for connecting to an external terminal for leading out the sensor signal to the external (ECU or the like of a vehicle).

The combustion pressure is detected as described herein. A combustion pressure generated in a combustion chamber 1a is transmitted to the fixing screw 201a through the heater 206 and the housing 201. Because the housing 201 is pushed up in the axial direction of the screw hole 1b and concomitantly deformed slightly, the load of the combustion pressure sensor 30 is relaxed. The sensor 30 converts the load change to an electrical signal and thus the combustion pressure is thereby detected.

A sequential work for attaching the glow plug with combustion pressure sensor J1 will be described with reference to FIG. 15 and FIG. 16. The combustion pressure sensor 30 is inserted previously along the fixing screw 201a of the housing 201 of the plug body 200 to attach the combustion pressure sensor 30 temporarily. At that time, because the outside diameter of the hexagonal portion 201b of the plug body 200 is larger than the inside diameter of the through hole 30a of the combustion pressure sensor 30 as shown in FIG. 14B, the plug body 200 is inserted into the through hole 30a of the combustion pressure sensor 30 from the heater 206 side (the insertion side to the screw hole 1b).

The plug body 200 is inserted into the screw hole 1b of the engine head 1 in this state, the hexagonal portion 201b is turned round the axis by use of a plug wrench 900 (refer to FIG. 15), only the plug body 200 is fastened to the screw hole 1b for holding and fixing. Then, the hexagonal portion 312 of a nut of the combustion pressure sensor 30 is turned round the axis along the fixing screw 201a of the housing 201 for fastening to hold and fix the bottom surface of the combustion pressure sensor 30 against the pedestal surface (surface) 1e of the engine head 1.

However, as the result of examination of the sequential attachment of the conventional glow plug J1 conducted by the inventors of the present invention, the problem described herein under was found. The hexagonal portion (nut portion) 201b of the plug body 200 into which a plug wrench 900 is inserted is located as close as possible to the lead wire 500 and the fixing metal member 333 of the combustion pressure sensor 30.

The reason why these components are located so close as described hereinabove is that addition of the vibration noise (for example, the frequency is 5 kHz or lower) generated from the plug body 200 itself to the combustion pressure detected by means of the combustion pressure sensor 30 is reduced more as the top end surface of the hexagonal portion 201b of the plug body 200 is located closer to the top end surface of the hexagonal portion 312 of the combustion pressure sensor 30. Specifically, as the length of the portion not held and fixed by means of other member and opened out of the plug body 200 is shorter. The close location is the important factor for securing the performance.

Therefore, in fastening the plug body 200, when a plug wrench 900 is fit on the hexagonal portion 201b as shown in FIG. 15, the end of the plug wrench 900 can touch the lead wire 500 and break the lead wire 500 due to bending or nicking or deformation or breaking of the fixing metal member 333.

Careful and cautious work is required to avoid interference between the plug wrench 900 and the lead wire 500 of the combustion pressure sensor 30 and entanglement between the lead wire 500 and the connector 400 and the portion around the engine.

As described hereinabove, when the glow plug J1 has a conventional combustion pressure sensor, there are workability and working efficiency problems due to the lead wire 500 connected to the combustion pressure sensor 30. Such problems are common not only for the glow plug with combustion pressure sensor but also for a structure that is screw-fixed to a screw hole formed on an engine by turning the one end of the structure that has been inserted into the screw hole round the axis and a combustion pressure sensor provided with a combustion pressure sensor attached to the structure (simply referred to as combustion pressure sensor hereinafter).

SUMMARY OF THE INVENTNION

It is therefore an object of the present invention to improve the workability in forming a combustion pressure sensor without adverse effects on a lead wire connected to a combustion pressure sensor.

To accomplish these and other objects, the invention described in a first aspect provides a combustion pressure sensor characterized in that the outer diameter of the end including the nut portion of the structure inserted into the screw hole is smaller than the inside diameter of the through hole of the combustion pressure sensor. Therefore, the structure can be inserted into the through hole of the combustion pressure sensor from the other end of the structure.

In the present invention, because the structure can be inserted from the nut portion side end (the other end), the sensor can be attached to the structure after the structure has been screw-connected to the screw hole of the engine. Therefore, the adverse effect of the lead wire connected to the combustion pressure sensor is eliminated. Therefore the workability is improved when the combustion pressure sensor is formed.

In another aspect, the lead wire for outputting the signal of the combustion pressure sensor to the external (ECU or the like) is detachable from the combustion pressure sensor. Thereby, the lead wire is detachable from the combustion pressure sensor. Because the lead wire is attached to the combustion pressure sensor after the structure has been screw-connected to the screw hole of the engine, workability is improved without adverse effect of the lead wire connected to the combustion pressure sensor when the combustion pressure sensor is formed. In another aspect, the lead wire is detachable from the combustion pressure sensor by means of the screw connection.

In another aspect, the combustion pressure sensor has a cutout portion formed by cutting from the outer periphery to the inside on the combustion pressure sensor. The combustion pressure sensor is disposed so that the cutout portion is fitted to the structure. Thereby, because the combustion pressure sensor can be attached after the structure has been screw-connected to the engine, the workability is improved without any adverse effect of the lead wire connected to the combustion pressure sensor when the combustion pressure sensor is formed.

In another aspect, the screw portion is formed on the inside surface of the through hole of the combustion pressure sensor into which the structure is inserted, and the screw portion of the structure is screw-connected to the screw portion of the though hole to thereby fix the combustion pressure sensor to the structure (the inventions described in the second aspect and a fifth aspect).

In another aspect, the combustion pressure sensor can be fixed to the structure by the axial force of the separate nut, which is a separate member from the combustion pressure sensor, that is screw-connected to the screw portion of the structure. In this case, it is not necessary to form the screw portion on the combustion pressure sensor.

In another aspect, the lead wire is connected to the combustion pressure sensor to be drawn out from the direction different from the action direction of the axial force of the separate nut. Thereby, the interference between the separate nut and the lead wire is prevented efficiently.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein:

FIG. 4A is a cross sectional view of an attachment of a conventional glow plug with combustion pressure sensor according to the prior art;

FIG. 4B is a cross sectional view of an attachment of a conventional glow plug with combustion pressure sensor according to the prior art;

DETAILED DESCRIPTION OF THE INVENTION

Figure 1:
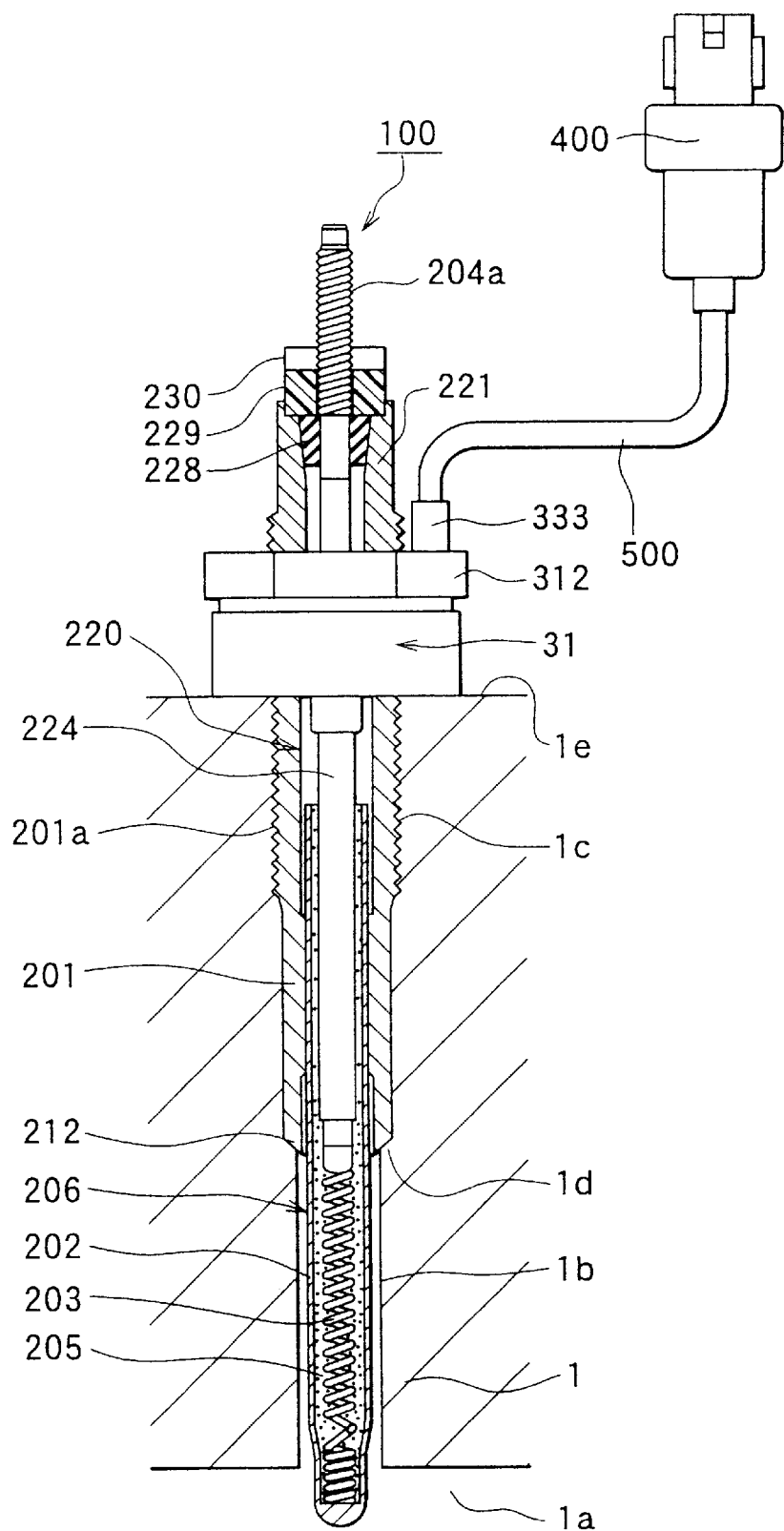
FIG. 1 A cross sectional view of a glow plug with combustion pressure sensor in accordance with a first embodiment of the present invention.
Figure 2A:
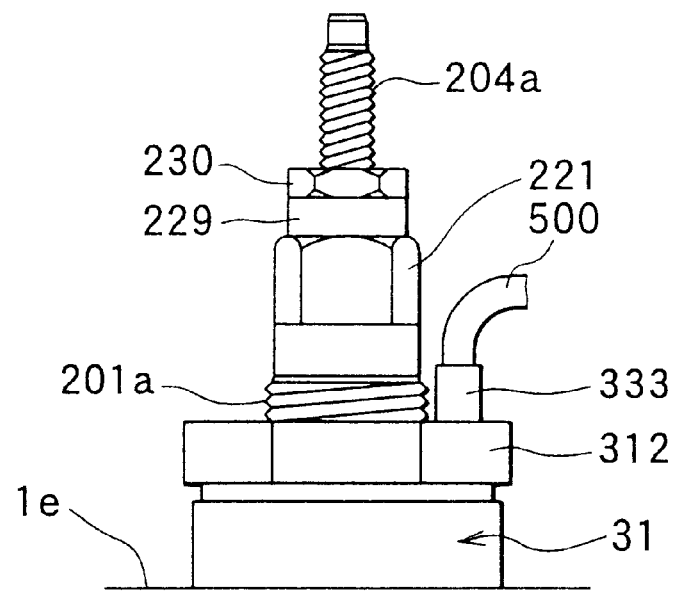
FIG. 2A is a side plan view of a glow plug according to the present invention.
Figure 2B:
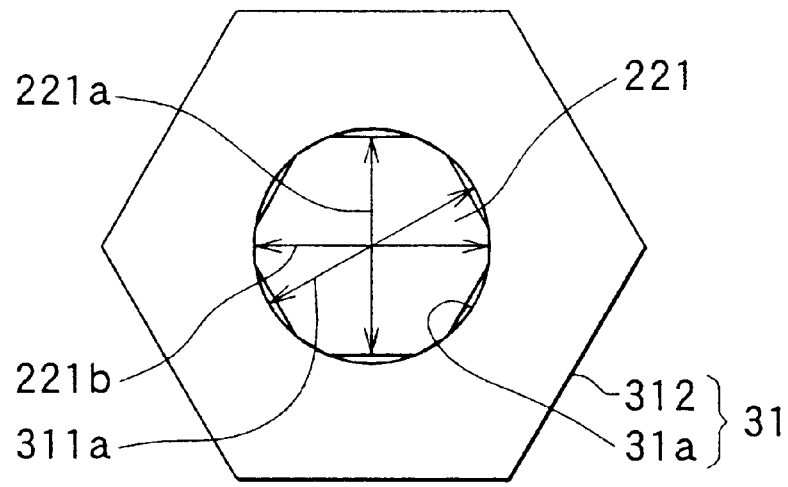
FIG. 2B is a top plan view of a hexagonal portion of a housing according to the present invention.

Referring to FIGS. 1, 2A and 2B, glow plug 100 comprises a plug body 220, the combustion pressure sensor 31, and a lead wire 500. The plug body 200 of the present invention is different from the above-mentioned conventional plug body 200 in that the structure of the portion projecting from the engine head 1, namely the other end (hexagonal portion 221 side) of the housing 201, is changed.

The engine head 1 consists of, for example, aluminum alloy or iron, and a screw hole (plug hole, fixing hole) 1b that penetrates from the outer surface to the inside combustion chamber 1a is formed on the engine head 1. The one end (lower side in FIG. 1) of the plug body (structure) 220 is inserted into the screw hole 1b and screw-fixed firmly. A housing 201 of the plug body 220 is a hollow pipe consisting of metal (low carbon steel or the like).

On the outer peripheral surface of the housing 201, a fixing screw (referred to as a screw portion of the structure in the present invention) 201a served for screw-connection to the screw hole 1b is formed, and on the other end (upper side in FIG. 1) the hexagonal portion (referred to as nut portion of the structure in the present invention) 221 for providing rotational force round the axis for the screw connection is formed. The plug body 220 is turned round the axis by means of the hexagonal portion 221 to thereby be screw-connected to the screw portion 1c of the screw hole 1b, and thus the plug body 220 is fixed to the screw hole 1b.

In the present embodiment, the combustion pressure sensor 31 is a ring component having the screw portion 311 (refer to FIG. 3 that will be described hereinafter) formed on the inside surface of the through hole 31a. The plug body (structure) 220 is inserted into the through hole 31a of the sensor 31, and the combustion pressure sensor 31 is fixed to the fixing screw 201a of the plug body 220 by means of screw connection. As described hereinabove, the combustion pressure sensor 31 is fixed to the outer peripheral surface of the projection at the portion of the plug body 220 that projects from the surface of the engine head 1 to the axis direction as shown in FIG. 1, and the combustion pressure sensor 31 is located in contact with the bearing surface (surface) 1e of the engine head 1.

The outside diameter of the other end including the hexagonal portion (nut portion) 221 out of the plug body (structure) 220 is smaller than the inside diameter of the through hole 31a of the combustion pressure sensor 31 (screw inside diameter 311a shown in FIG. 2B). The plug body 220 can be inserted into the through hole 31a of the combustion pressure sensor 31 from the other end. The detail of this structure will be described with comparison with the conventional art J1 shown in FIG. 14.

Figure 14A:
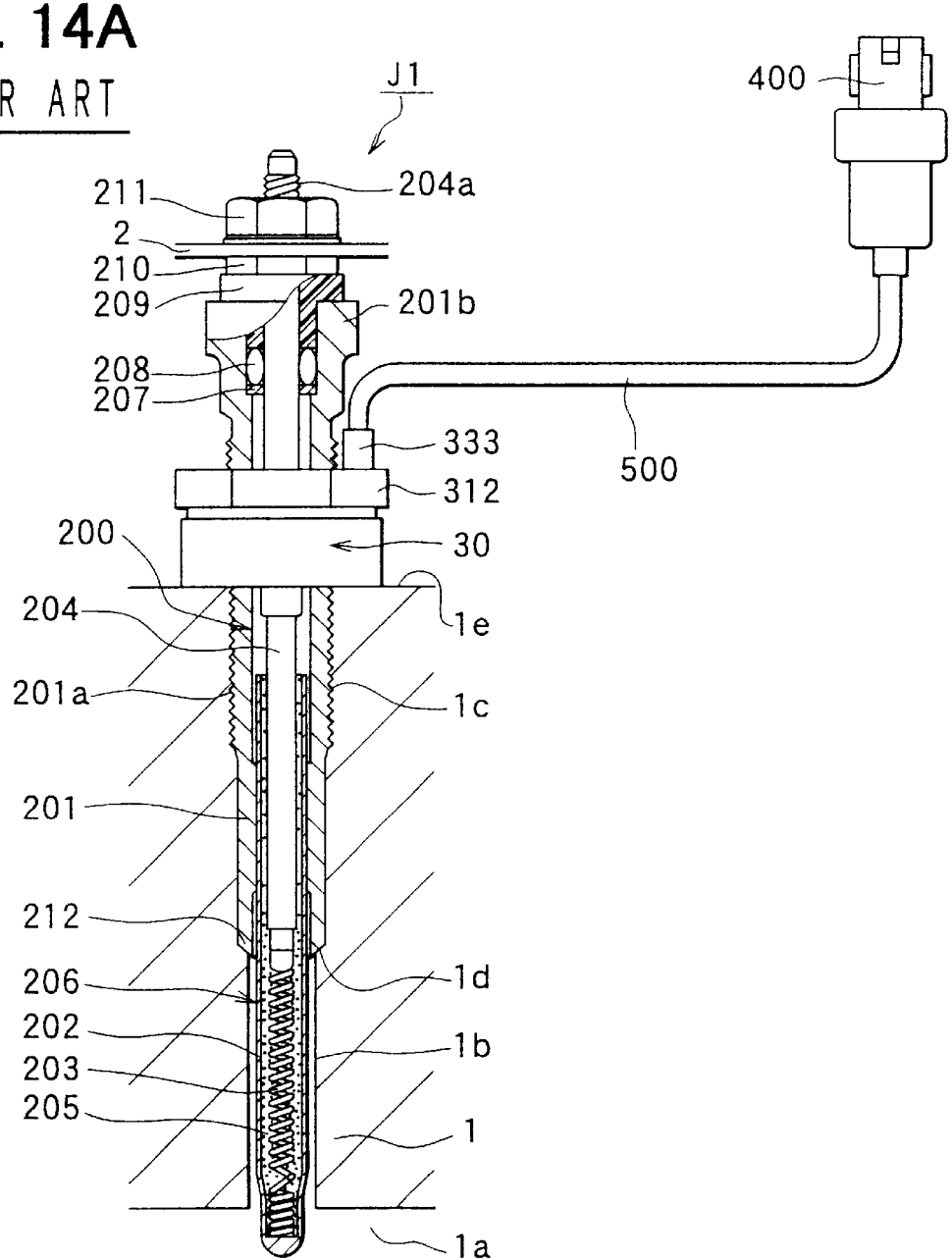
FIG. 14A is a cross sectional view illustrating the general structure of a conventional glow plug with combustion pressure sensor according to the prior art.

At first, when the fixing screw 201a of the plug body 200 is a male screw of M10 and 1.25 mm pitch in the conventional art J1 shown in FIG. 14, the screw portion 311 on the inside surface of the through hole 30a of the combustion pressure sensor 30 is a female screw of M10 and 1.25 mm pitch so as to fit to the male screw. In this case, the minimum diameter of the screw portion 311 on which the female screw is formed of the sensor 30, namely the inside diameter of the screw, is, for example, 8.7 mm.

When the conventional art J1, because all the portions ranging from the fixing screw 201a to the heater 206 side (one end) out of the plug body 200 has a smaller outside diameter than the screw inside diameter 311a of the combustion pressure sensor 30, the combustion pressure sensor 30 can be inserted from the heater 206 side as a matter of course.

Figure 14B:
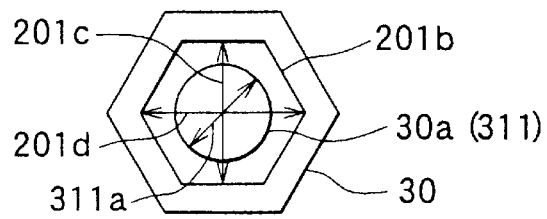
FIG. 14B is a top plan view illustrating the general structure of a conventional glow plug with combustion pressure sensor according to the prior art.

However, on the other end of the plug body 200, the standardized hexagonal portion 201b having the outside diameter larger than the screw inside diameter 311a of the combustion pressure sensor 30 is formed on the end of the housing 201 (refer to FIG. 14B). For example, in the conventional hexagonal portion 201b, the width across flats of the hexagonal 201c is 12 mm, and the distance between facing apex angles 201d (distance between apex angles) is 13.8 mm. Therefore, in the conventional art, the sensor 30 is not inserted from the hexagonal portion 201b side.

As described hereinabove, the combustion pressure sensor 30 is not inserted from the hexagonal portion 201b end surface side of the plug body 200 in the cast of the conventional art J1. On the other hand, the combustion pressure sensor 31 can be inserted from the hexagonal portion 221 end surface side (other end) of the plug body 200 in the present embodiment.

In detail, as shown in FIG. 2, in the present embodiment, the distance between apex angles 221b, that is the maximum outside size portion of the hexagonal portion 221 of the plug body 220, is smaller than the screw inside diameter 311a of the combustion pressure sensor 31. The outside size of all the portions located from the hexagonal portion 221 to the fixing screw 201a of the housing 201 is smaller than the screw inside diameter 311a of the sensor 31. Thereby, plug body 220 is inserted from the other end of the plug body 220 into the combustion pressure sensor 31 and the combustion pressure sensor 31 is fixed easily after the plug body 220 has been fixed alone to the engine head 1.

For reference, the size of the hexagonal portion 221 of the plug body 220 of the present embodiment may be as shown herein. Herein, to sufficiently secure the hexagonal width across flats 221a that is served as substantial thread engagement for a plug wrench, the hexagonal width across flats 221a is 8 mm commonly according to the coming new ISO standard, and the distance between apex angles 221b is, for example, smaller than ø8.7 mm that is smaller than the screw inside diameter 311a of ø8.7 mm, wherein, for example, the sharp angle portion of the apex angle is removed. The outside diameter size of portions located from the hexagonal portion 221 to the fixing screw portion 201a is smaller than ø8.7 mm entirely.

As described hereinabove, the present embodiment is characteristic in that the outside diameter size of the hexagonal portion 221 of the housing 201 and peripheries is small, and the inside of the housing 201 having a small diameter is advantageous in structure. At first, when the conventional art J1, as shown in FIG. 14, a washer 207 consisting of insulating Bakelite material and O-ring 208 consisting of silicone rubber or fluorine rubber are inserted to the center shaft 204. The washer is served for holding the O-ring 208 and centering the center shaft 204, and the O-ring is served for water-proofing and air-tightening the inside of the housing 201.

Furthermore, in the conventional art J1, the center shaft 204 is fixed to the housing 201 with the fixing nut 210 along the terminal screw 204a provided on the center shaft 204 with interposition of an insulating bush 209 consisting of insulating resin such as phenol or the like. Herein, the insulating bush 209 is also for preventing contact short-circuit between the center shaft 204 and the housing 201.

Though the inside of the housing is structured as described hereinabove in the conventional art J1, in the present embodiment, the center shaft 224, insulating bush 229, and fixing nut 230 having a small diameter are used in the inside of the housing 201 having a small diameter. The air-tight rubber 228 consisting of molded rubber having a taper shape is used to ensure the centering of the center shaft 224 and to ensure the water-proofing and air-tightness in the housing 201. Thus, the O-ring 208 and the washer 207 that are used conventionally are eliminated.

The hexagonal portion 221 and relating portions that are unique for the present embodiment are described hereinabove, and other portions of the glow plug with combustion pressure sensor 100 will be described further with reference to FIG. 1.

The plug body 220 is provided with the hollow pipe shaped sheathed tube 202 held in the housing 201. The sheathed tube 202 consists of heat-resistant and corrosion-resistant alloy (for example, stainless steel SUS 310 or the like). The one end (under side in FIG. 1) is closed and the other end (upper side in FIG. 1) is open. A heating coil 203 comprising a resistance wire consisting of NiCr and CoFe or the like is provided in the inside of the one end of the sheathed tube 202, and the above-mentioned one end of the center shaft 224 comprising a metal rod is inserted into the inside of the other end of the sheath.

The one end of the heating coil 203 is connected to the one end of the sheathed tube 202, and the other end of the heating coil 203 is connected to the one end of the center shaft 224. Insulating powder 205 consisting of heat-resistant magnesium oxide is filled between the heating coil 203 and the center shaft 224 and the sheathed tube 202.

The sheathed tube 202 is drawn by swaging. Thereby, the insulating powder 205 filled in the inside is compacted, and the sheathed tube 202, the center shaft 224, and the heating coil 203 are held and fixed firmly with the insulating powder 205.

In the portion including the heating coil 203 out of the sheathed tube 202, the heater 206 comprises the sheathed tube 202, the heating coil 203, and the insulating powder 205. The heater 206 is connected and held in the inside of the housing 201 so that the one end (one end of the sheathed tube 202) is exposed. The heater 206 (the outer peripheral surface of the sheathed tube 202) and the housing 201 may be connected together by means of pressure engagement fitting or brazing with silver solder.

A connecting bar not shown in the drawing is fixed to the terminal screw 204a provided on the other end of the center shaft 224 with a terminal nut as in the same manner as shown in FIG. 14 for electrical connection. The connecting bar is connected to a power source not shown in the drawing, and earthed to the engine head 1 through the center shaft 224, heating coil 203, sheathed tube 202, and housing 201. Thereby, the heater 206 is heated in the glow plug 100 so as to function for ignition start auxiliary action of the diesel engine.

The heater 206 may be a ceramic heater prepared by, for example, a heater consisting of conductive ceramic containing silicon nitride and molybdenum silicate enclosed with insulating ceramic containing silicon nitride that is sintered instead of the above-mentioned metal heater comprising a metal resistance wire.

Figure 3A:
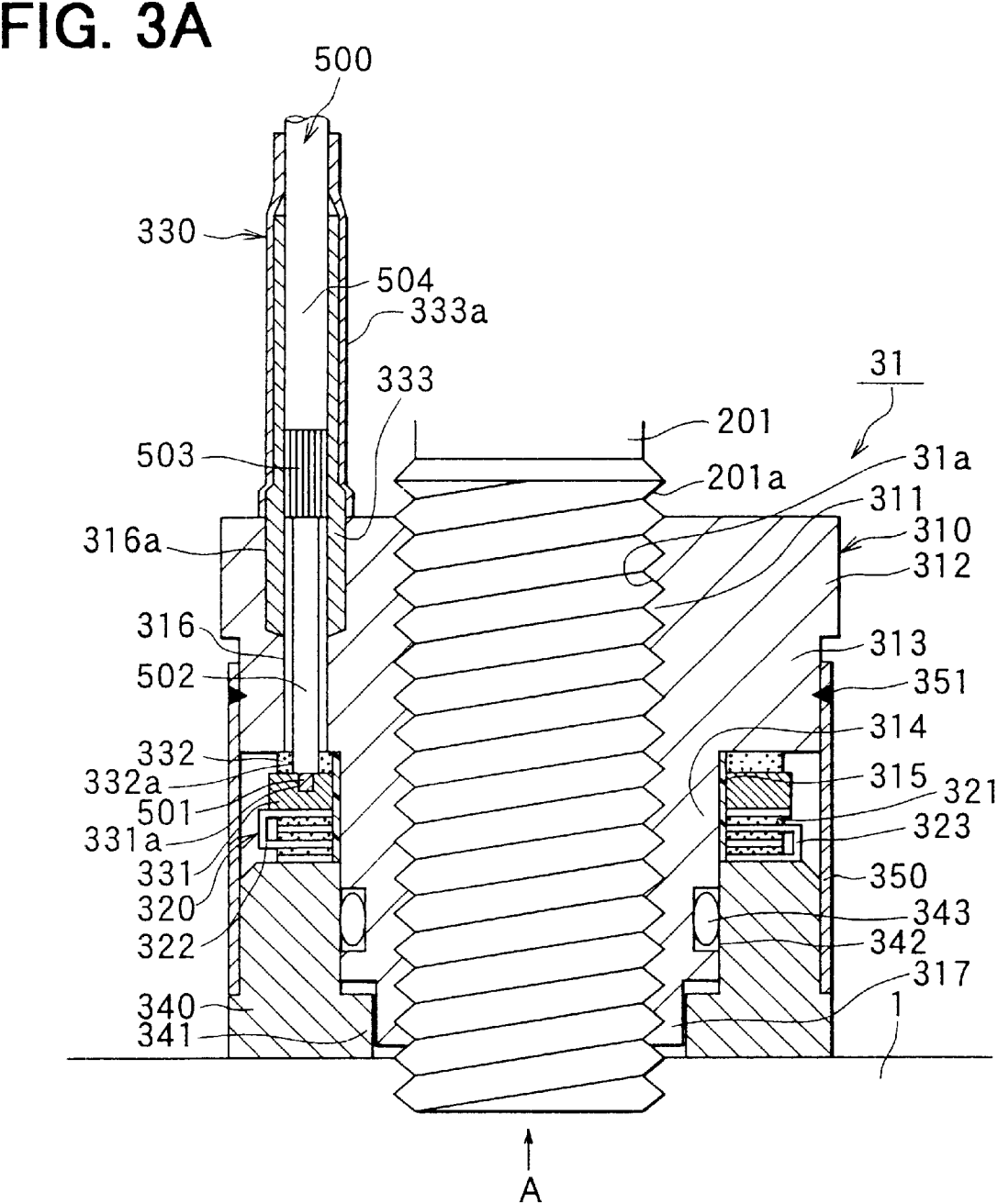
FIG. 3A is a cross sectional view of a combustion pressure sensor according to the present invention.
Figure 3B:
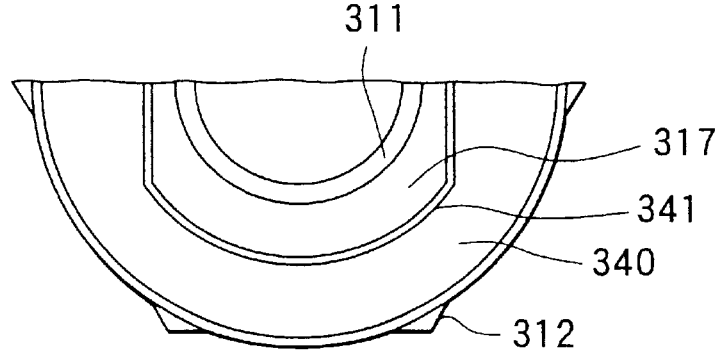
FIG. 3B is a cross sectional view of a combustion pressure sensor according to the present invention.

Next, in the present embodiment, as described hereinabove, the ring-shaped combustion pressure sensor 31 is attached on the longitudinal middle portion of the plug body 220 by a screw connection. Because the combustion pressure sensor 31 is different from the conventional sensor 30 in that the details are changed, the details will be described with reference to FIG. 3. FIG. 3 is an enlarged view illustrating the detail of the combustion pressure sensor (pressure sensor) 31 shown in FIG. 1A is a vertical sectional view and 1B is a view from the arrow A shown in 1A

The combustion pressure sensor 31 is provided with a nut (sensor fixing portion) 310 for fixing the sensor body to the plug body (structure) 220, a piezoelectric element portion 320 for generating the electric signal (charge) in response to the force caused from combustion pressure, a lead portion 330 for taking out the electric signal from the piezoelectric element portion 320 and leading to the lead wire 500, a pedestal 340 for holding the piezoelectric element portion 320 with the nut 310 and fixing a part of the lead portion 330, and a metal case 350 for dust-proofing and water-proofing.

At first, the nut 310 and the lead portion 330 will be described. The nut 310 consisting of metal is provided with the above-mentioned screw portion 311 and hexagonal portion 312 for attaching and fixing the sensor body with the fixing screw 201a of the housing 201 and is fixed to the outer periphery of the housing 201. Furthermore, under the hexagonal portion 312, a large diameter portion and small diameter portion 314 are formed in this order, and a heat-shrinkable insulating tube 315 consisting of silicon is fixed tightly on the outer peripheral surface of a small diameter portion.

The lead portion 330 electrically connects between the piezoelectric element portion 320 and the one end of the lead wire 500, and is provided with an electrode 331, an insulator 332, a fixing metal member 333, and one end of the lead wire 500 as structural component. The electrode 331 is a ring metal member, and the insulator 332, which is a ring member consisting of insulating material such as mica or alumina, is interposed between the electrode 331 and the nut 310 for insulating these components 331 and 310. The electrode 331 and insulator 332 are fitted on the outer edge of a small diameter portion 314 of the nut 310 covered with the insulating tube 315.

Herein, the lead wire 500 is formed by laminating a conductive signal leading wire 501, an insulative insulation coating 502, a conductive earth side shield wire 503, and an insulative insulation coating 504 from the innermost portion to the outside. The signal leading wire 501 is insulated from the earth side shield wire 503 electrically. As shown in FIG. 3, the lead wire 500 is structured so that the signal leading wire 501, the insulation coating 502, and the earth side shield wire 503 arranged in the order from the top end are exposed partially on the one end.

Around the one end of the lead wire 500, the signal leading wire 501 is welded and connected to the electrode 331 in the hole 331a formed on the electrode 331 through the hole 316 formed on the nut 310 and cutout portion 332a formed on the insulator 332. The other end of the lead wire 500 is connected to the connector 400 to be connected electrically to the external circuit (ECU or the like of an vehicle).

The fixing metal member 333 that is a hollow pipe for fixing the lead wire 500 to the nut 310 is provided on the outer periphery of one end of the lead wire 500. The upper side portion of the above-mentioned hole 316 formed on the nut 310 is for the fixing metal member holding hole 316a for holding the fixing metal member 333. A part of the fixing metal member 333 is inserted and fixed to the holding hole 316.

The fixing metal member 333 is caulked fixedly to the lead wire 500, and the earth side shield wire 503 is connected electrically to the fixing metal member 333. The outer peripheral portion of the fixed metal member 333 that projects from the fixing metal member holding hole 316a is covered with heat-shrinkable insulation cover 333a consisting of silicon.

Next, the piezoelectric element portion 320 having a ring hollow portion having a diameter corresponding to a small diameter portion 314 of the nut 310 is disposed along the outer peripheral surface of a small diameter portion with interposition of the above-mentioned insulation tube 315 like the above-mentioned electrode 331. In the example shown in the drawing, the piezoelectric element portion 320 is a laminate structure comprising three piezoelectric ceramics (piezoelectric elements) 321, a signal leading side washer ring 322, and an earth side washer ring 323.

Each piezoelectric ceramic 321 is a disk ring having the same size consisting of lead titanate, lead titanate zirconate, or the like. These three piezoelectric ceramics 321 are electrically connected in parallel. The output sensitivity of these three piezoelectric ceramics 321 is totaled, and the sensitivity is improved significantly.

Next, the pedestal 340 is a metal ring, on which a lock washer 341 is formed at the end surface side that contacts engine head 1. The lock washer 341 corresponds to the oval-shaped detent 317 formed on the end of a small diameter portion 314 of the nut 310, and the lock washer 341 is oval-shaped so as to be fitted to the detent 317 easily. Thereby, the deviation round the axis of the plug between the nut 310 and the pedestal 340 is prevented.

Furthermore, on the outer periphery of the pedestal 340, a cylindrical metal case 350 consisting of metal such as SUS 304 is disposed, and the metal case 350 encloses the whole periphery of the combustion pressure sensor 31. The metal case 350 is formed by drawing a thin metal plate having a thickness of 0.5 mm or thinner into a cylinder-shape, and it is joined along the entire periphery of the pedestal 340 by means of laser welding or brazing with solder such as copper solder.

When the pedestal 340 combines to the metal case 350, the lock washer 341 is faced accurately to the detent 317 of the nut 310. Furthermore, the inner diameter portion 342 of the pedestal 340 is closely in contact with the O-ring 343 consisting of silicone rubber or fluorine rubber that is engaged with the cut groove formed around the center of a small diameter portion 314 of the nut 310. Furthermore, the metal case 350 is engaged with the large diameter portion 313 of the nut 310 in contact with the inside surface of the large diameter portion 313, and the inscribed portion 351 between the nut 310 and the large diameter portion 313 is entirely joined along the periphery by means of YAG laser welding.

As described hereinabove, the pedestal 340 is pressed on the surface of the engine head 1 by means of axial force (screwing force) of the nut 310. Furthermore, the piezoelectric element portion 320, the electrode 331, and the insulator 332 are fixedly held and interposed between the nut 310 and the pedestal 340 by means of the axial force of the nut 310.

The above-mentioned combustion pressure sensor 31 is fabricated as described herein under. The signal leading wire 501 is welded to the hole 331a of the electrode 331 at one end of the lead wire 500. Furthermore, the fixing metal member 333 is engaged with the fixing metal member holding hole 316a of the nut 310 and connected to it by means of welding or brazing with copper solder or the like.

The insulator 332 is attached to a small diameter portion 314 of the nut 310.

The other end of the lead wire 500 is inserted into the hole 316 of the nut 310, to which the fixing metal member 333 and the insulator 332 have been attached, from the insulator 332 side. The electrode 331 to which the one end of the lead wire 500 is connected is engaged with a small diameter portion 314 of the nut 310.

The electrode 331 is disposed on the predetermined position and the fixing metal member 333 and the earth side shield wire 503 are caulked and fixed simultaneously. Thereafter, a portion of the lead wire 500 and the fixing metal member 333 are covered with the insulating cover 333a for dust-proofing and water-proofing. Thereby, the earth side shield wire 503 is connected to the fixing metal member 333 also electrically.

Next, the piezoelectric element portion 320 comprising the piezoelectric ceramics 321 and both washer rings 322 and 323 is inserted into a small diameter portion 314 of the nut 310. The pedestal 340 that has been combined with the metal case 350 by brazing or the like is inserted into a small diameter portion 314 of the nut 310. The detent 317 is coincides with the lock washer 341. The metal case 350 and large diameter portion 313 are joined by laser welding, maintaining the pedestal 340 and the nut 310 in close contact. Thus, the combustion pressure sensor 31 is completed.

Next, the combustion pressure sensor 31 is attached to the plug body 220. Herein, in the present embodiment, because the outside diameter of the other end including the hexagonal portion 221 out of the plug body 220 is smaller than the screw inside diameter 311a of the combustion pressure sensor 31 as described hereinabove, the plug body 220 can be inserted into the through hole 31a of the combustion pressure sensor 31 from the other end.

Figure 15:
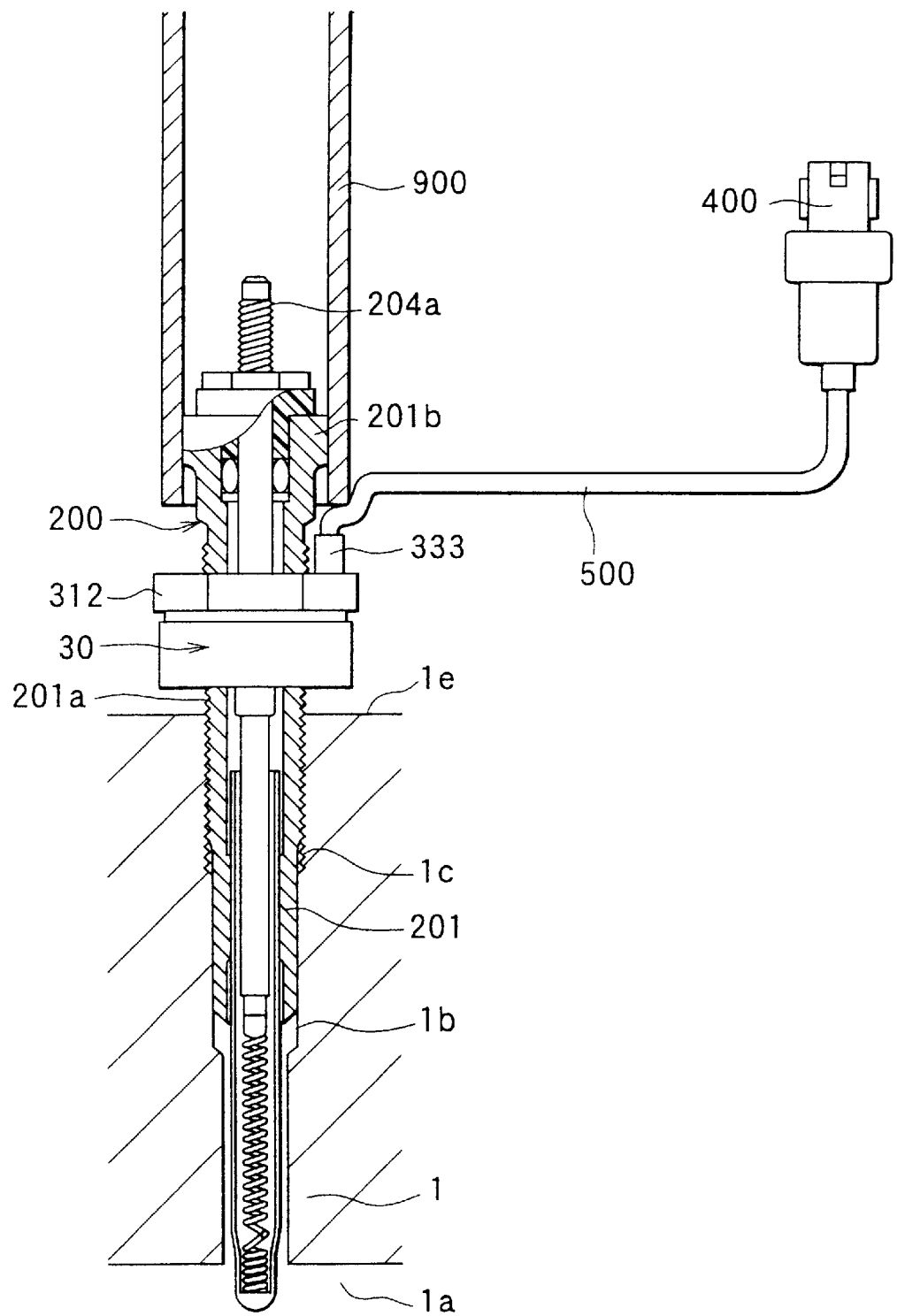
FIG. 15 is cross sectional view illustrating the attachment for attaching a plug body of a glow plug with combustion pressure sensor according to the present invention.

At first, the one end (heater 206 side) of the plug body 220 is inserted into the screw hole 1b. The hexagonal portion 221 of the housing 201 is turned round the axis by use of a plug wrench as shown in FIG. 15. In the present embodiment, an air impact wrench may be used as the plug wrench 900. The fixing screw 201a of the plug body 220 is screw-connected to the screw portion 1c of the screw hole 1b, and the plug body 220 is attached fixedly to the engine head 1.

Figure 16:
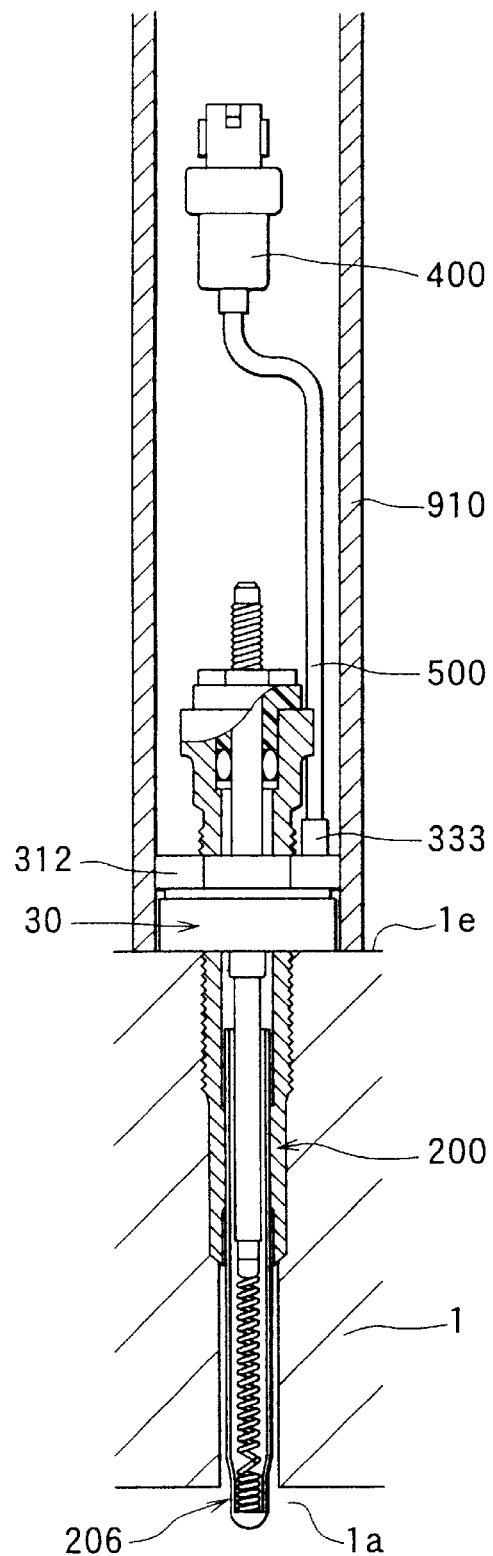
FIG. 16 is a cross sectional view of the attachment of a combustion pressure sensor of a glow plug according to the prior art.

Next, the combustion pressure sensor 31 is fitted to the plug body 220 from the other end (hexagonal portion 221 side), the nut 310 of the combustion pressure sensor 31 is tightened along the fixing screw 201a of the plug body 220 in the same manner as shown in FIG. 16. Thereby, the combustion pressure sensor 31 is pressed fixedly to the bearing surface 1e of the engine head 1. As described hereinabove, the combustion pressure sensor shown in FIG. 1 is completed.

Next, the operation of the present embodiment will be described based on the above-mentioned structure. When the diesel engine is started, a voltage is applied to the plug body 220 from a power source not shown in the drawing through the above-mentioned connection bar. The voltage is earthed to the engine head 1 through the center shaft 224, heating coil 203, sheathed tube 202, and housing 201. Thereby, the heater 206 is heated to thereby function for auxiliary ignition starting of the diesel engine.

After starting the engine, the combustion pressure generated in the engine is transmitted to the fixing screw 201a through the heater 206 and housing 201. Subsequently, the combustion pressure transmitted to the fixing screw 201a relaxes the tightening torque that is exerted for tightening it to the engine head 1 in the glow plug 100. Concomitantly, the load (load in the plug axis direction) loaded on the piezoelectric ceramics 321 through the screw portion 311 of the nut 310 in the combustion pressure sensor 31 is relaxed (in other words, the load loaded on the piezoelectric ceramics 321 is changed).

Therefore, the generated charge of the electric signal generated based on the piezoelectric characteristic of the piezoelectric ceramics 321 is changed. Then, the electric signal (charge) is sent to the external circuit from the electrode 331 and the lead wire 500 through the connector 400, converted to a voltage, and transmitted and applied for combustion control as, for example, combustion pressure waveform signal after amplification and filter processing. The above is the whole combustion pressure detection mechanism in the above-mentioned glow plug 100.

Also, according to the present embodiment, because the combustion pressure sensor 31 can be inserted from the end on the hexagonal portion (nut portion) 221 side of the plug body 220, the combustion pressure sensor 31 can be attached to the plug body 220 after the plug body (structure) 220 has been screw-connected to the screw hole 1b of the engine. Therefore, when the glow plug 100 is attached to the engine head (in other words, when a combustion pressure sensor is formed), the lead wire 500 connected to the combustion pressure sensor 31 does not hamper the fabrication work, and the workability is improved.

Because there are no combustion pressure sensor 31, no lead wire 500, and no fixing metal member 333, no contact (interference) between these components and a plug wrench 900 occurs during tightening work of the plug body 220. Therefore, these components are prevented from being broken, deformed, or damaged due to contact with the plug wrench. Furthermore, in the conventional art, when a plug wrench 900 is dropped on a combustion pressure sensor, the piezoelectric element in the combustion pressure sensor can be damaged and fail. The present invention will not cause such problem.

According to the present invention, an air impact wrench, which is excellent in workability in attaching work used generally for glow plug alone, may be used without any problem as with the plug wrench 900. As described hereinabove, according to the combustion pressure sensor of the present invention, the attaching workability and the quality of the combustion pressure sensor 31 are secured, and the work efficiency is improved.

Furthermore, according to the present embodiment, the problem of erroneous attachment of a conventional glow plug with combustion pressure sensor J1 as subsequently shown in FIG. 4 is solved. FIG. 4A is a cross sectional view of the glow plug J1 shown in FIG. 14, and 4B is a cross sectional view illustrating erroneous attachment of the glow plug J1.

It is assumed that the length L2 ranging from the housing bottom end surface 201e to the bottom end surface of the combustion pressure sensor 30 is equal to or shorter than the depth L1 (plug hole depth, refer to FIG. 4B) of the screw hole 1b ranging from the taper bearing surface portion 1d to the bearing surface 1e of the engine head 1, for example, as shown in FIG. 4A, in the state that the combustion pressure sensor 30 is temporarily attached to the fixing screw 201a of the plug body 200. If the plug body 200 is tightened further in this state, then the bottom end surface of the combustion pressure sensor 30 is brought into contact with the bearing surface 1e of the engine head 1 before the housing taper portion 212 is brought into contact with the taper bearing surface portion 1d, and the space S remains as shown in FIG. 4B.

At that time, though the plug body 200 is tightened alone, the plug body 200 pulls the combustion pressure sensor 30 toward the combustion chamber 1a in the same axial direction. As the result, the plug body 200 continues to closely press the combustion pressure sensor 30 onto the bearing surface 1e of the engine head 1 until the magnitude of the force reaches to the standardized recommended tightening torque.

Therefore, in spite of the screw torque that is not the axial load according to the standard exerted to closely press the housing taper portion 212 onto the taper bearing surface portion 1d, the screw torque reaches the recommended tightening torque relatively in pressing between the combustion pressure sensor 30 and the bearing surface 1e of the engine head 1.

As a result, the combustion gas, namely combustion pressure, leaks from the gap S shown in FIG. 4B, the performance of the combustion pressure sensor 30 is deteriorated due to thermal effect, the engine output is decreased, the engine vibrates due to combustion fluctuation, and acceleration becomes poor. These malfunctions give make a driver feel unpleasant. On the other hand, according to the present invention, because the combustion pressure sensor 31 can be attached to the plug body 220 after the plug body (structure) 220 is screw-connected to the screw hole 1b of the engine, such erroneous attachment problem as described hereinabove is prevented.

Furthermore, according to the present invention, the distance ranging from the top end surface of the nut 310 of the combustion pressure sensor 31 to the top end surface of the hexagonal portion 221 of the plug body 220 is shortened from, for example, the conventional distance of about 60 mm to, for example, 30 mm, as the result the detection of the combustion pressure becomes more accurate.

The reason for better detection is that the shortened length together with the reduced weight of the plug body 220 to half weight due to thinning of the plug body 220 brings about reduction of mechanical vibrational noise generated from the plug body 200 itself. The frequency of the mechanical noise can be increased to, for example, a high frequency not included in the combustion frequency of several Hz to 5 kHz necessary for the combustion pressure sensor 31 to perform combustion control.

Figure 5:
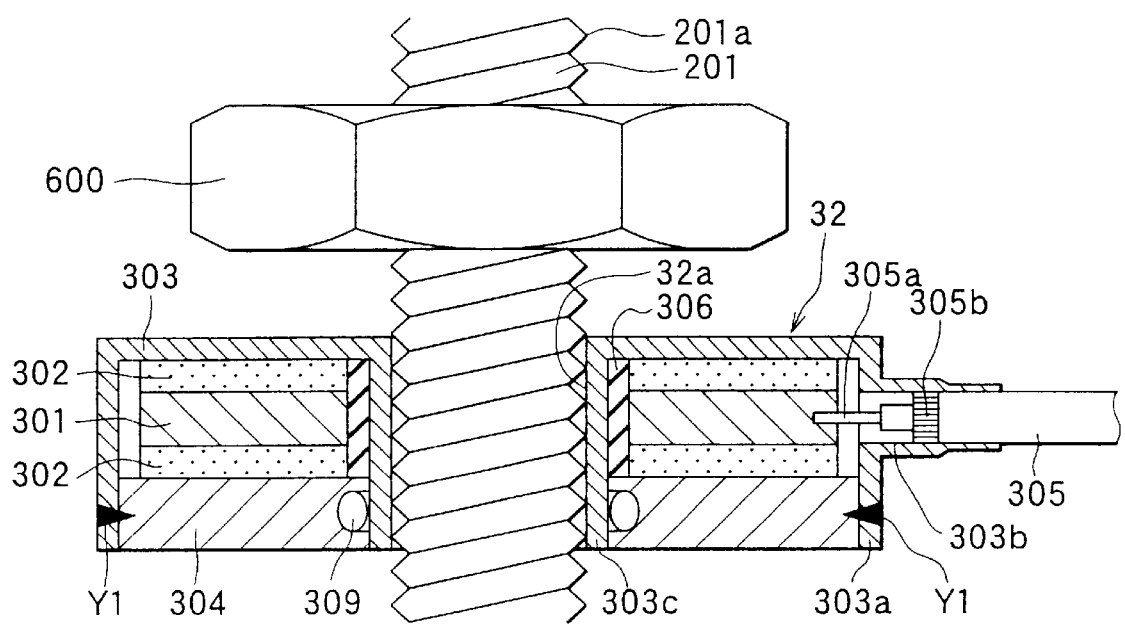
FIG. 5 A cross sectional view illustrating a combustion pressure sensor according to the present invention.

The first embodiment is described hereinabove, and a modified example of the present embodiment is shown in FIG. 5, that is a schematic cross sectional view. In the modified example, the female screw is not formed on the through hole 32a of the ring-shaped combustion pressure sensor 32 as shown in FIG. 5. A separate nut 600 having screw alone function is combined, and the same effect as obtained in the above-mentioned example is obtained. Because the structure of the combustion pressure sensor 32 (pressure sensor) used in the present modified example is somewhat different from that of the above-mentioned combustion pressure sensor 31, the detailed structure of the combustion pressure sensor 32 will be described with reference to FIG. 5.

In the sensor 32, two ring-shaped polar piezoelectric ceramics 302 consisting of lead titanate or lead titanate zirconate are disposed one on the other round the ring-shaped electrode 301 and connected in parallel electrically. These components constitute a piezoelectric element portion. The electrode 301 and the piezoelectric ceramics 302 are interposed and packed between an approximately ring-shaped metal case 303 and an approximately ring-shaped pedestal 304 protectively.

A protection tube 303b acting as a through hole is formed with the large diameter portion 303a of the metal case 303 by means of welding or brazing. A shielded wire (referred to as the lead wire in the present invention) for taking out the sensor signal to the external is inserted into the tube 303b, and held therein. The core wire 305a of the shielded wire inserted into the metal case 303 is welded to the electrode 301 for connection. The shielding wire 305b insulated from the core wire is caulked with the protection tube 303b to thereby be connected to the metal case 303 that is served also as the body earth.

The combustion pressure sensor 32 is fabricated as described herein under. At first, a heat-shrinkable insulation tube 306 consisting of silicon is heated and fit on the circumferential side surface of a small diameter portion 303c of the metal case 303. The piezoelectric ceramic 302, the electrode 301, and the piezoelectric ceramic 302 are put on a small diameter portion 303c of the metal case in that order. The insulation tube 306 prevents electrical short-circuit between the piezoelectric ceramics 302, the electrode 301, and the metal case 303.

Herein, the electrode 301 to which the core wire 305a of the shielded wire has been welded is put on the metal case 303. The electrode 301 is put on a small diameter portion 303c of the metal case 303 feeding the end of the shielded wire 305 opposite to the connection end from the protection tube 303b to the outside of the case 303.

Subsequently, the pedestal 304 to which the O-ring 309 has been put on is inserted into the metal case 303. The contact side surfaces of the outermost periphery are joined together by means of YAG laser welding with pressing the metal case 303 and the pedestal 304 vertically (welding portion is shown with Y1 in FIG. 5). Thereby, all the components are combined together closely and tightly in the combustion pressure sensor 32.

Because the shielded wire 305 and the protection tube 303b are caulked, the electrical connection between the shielded wire 305b and the metal case 303, the firm holding of the wire 305, and the close contact between the wire 305 and the tube 303b are secured. Thereby, the metal case 303, the pedestal 304, and the shielded wire 305b are maintained at the same potential. Thus, the combustion pressure sensor 32 of the modified example is completed as described hereinabove.

The combustion pressure sensor 32 is fit to the plug body 220 that has been attached to the screw hole 1b from the other end (hexagonal portion 221 side) and a separate nut 600 is also fit. The separate nut 600 is tightened along the fixing screw 201a of the housing 201 to thereby fixedly support the combustion pressure sensor on the surface of the engine head 1. As described hereinabove, attachment of the glow plug with combustion pressure sensor 100 having the combustion pressure sensor 32 of the present modified example is completed.

As described hereinabove, in the present modified example, the combustion pressure sensor 32 is fixed to the plug body 220 by means of the axial force of the separate nut 600 that has been screw-connected to the fixing screw 201a of the plug body 220. In this case, in addition to the above-mentioned effect, it is not necessary to form the screw portion on the inside surface of the through hole 32a of the combustion pressure sensor 32.

The shielded wire (lead wire) 305 is drawn in a direction different from the action direction of the axial force of the separate nut 600 with respect to the combustion pressure sensor 32, namely in the direction of circumferential side surface of the combustion pressure sensor 32. Thereby, the interference between the separate nut 600 and the lead wire 305 is prevented efficiently.

(Second Embodiment)

Figure 6:
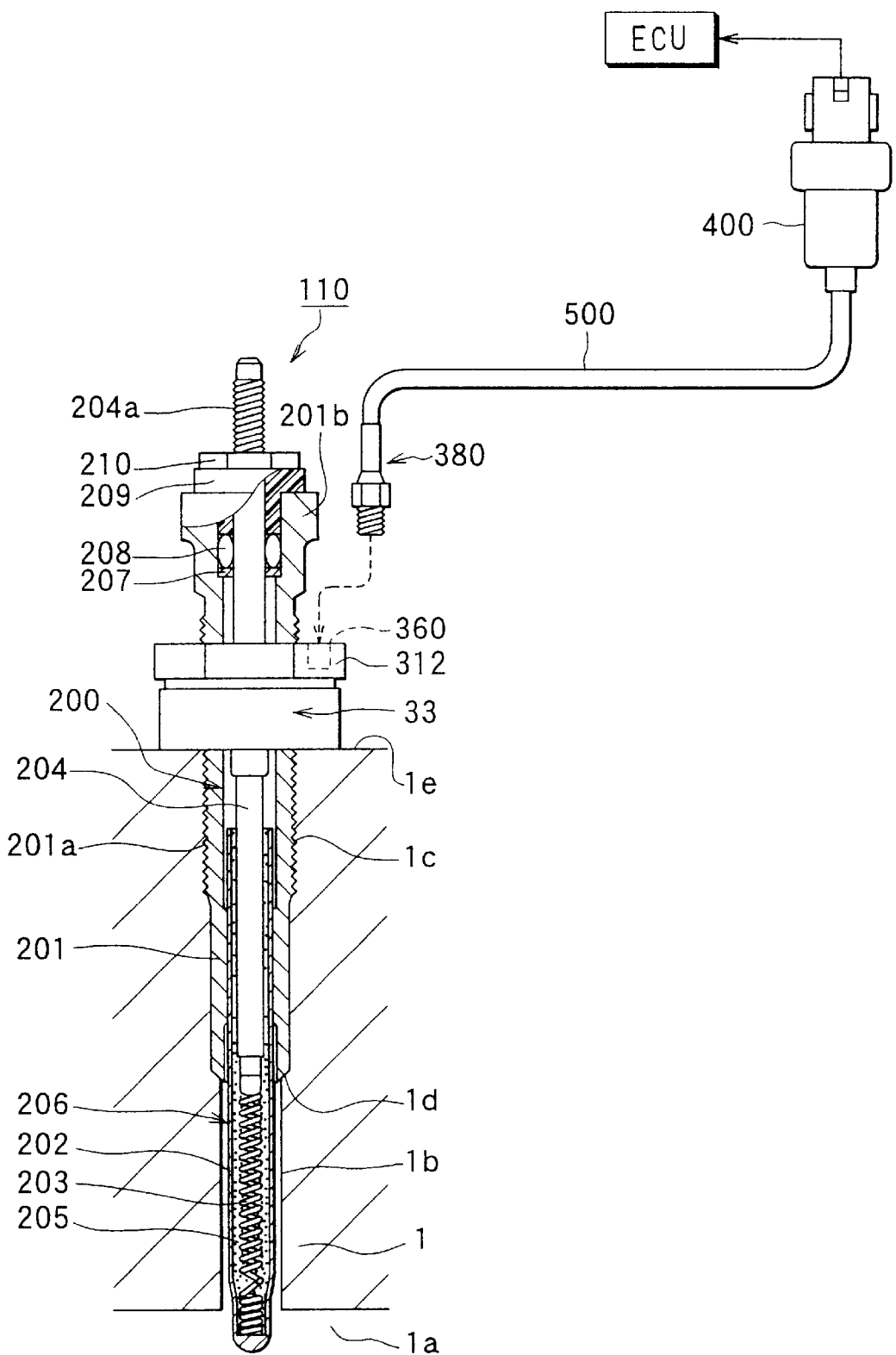
FIG. 6 is a cross sectional view of a glow plug with combustion pressure sensor in accordance with the second embodiment of the present invention.

The second embodiment is a glow plug with combustion pressure sensor served as a combustion pressure sensor having a lead wire that is detachable from the combustion pressure sensor. FIG. 6 is a partial vertical cross sectional view illustrating the whole structure of a glow plug with combustion pressure sensor 110 in accordance with the present embodiment that is attached to an engine head 1 of a diesel engine. In the glow plug 110, the conventional plug body 200 shown in FIG. 14 is used and the combustion pressure sensor 33 is changed.

In some cases, it is difficult to miniaturize the hexagonal portion 201b of the plug body 200 inevitably due to strength in consideration of the using environment condition. In such case, the combustion pressure sensor is attached temporarily to the plug body 200 first and then attached to the engine head 1 as in the conventional case. The present embodiment can realize the object of the present invention even in such case.

Figure 7:
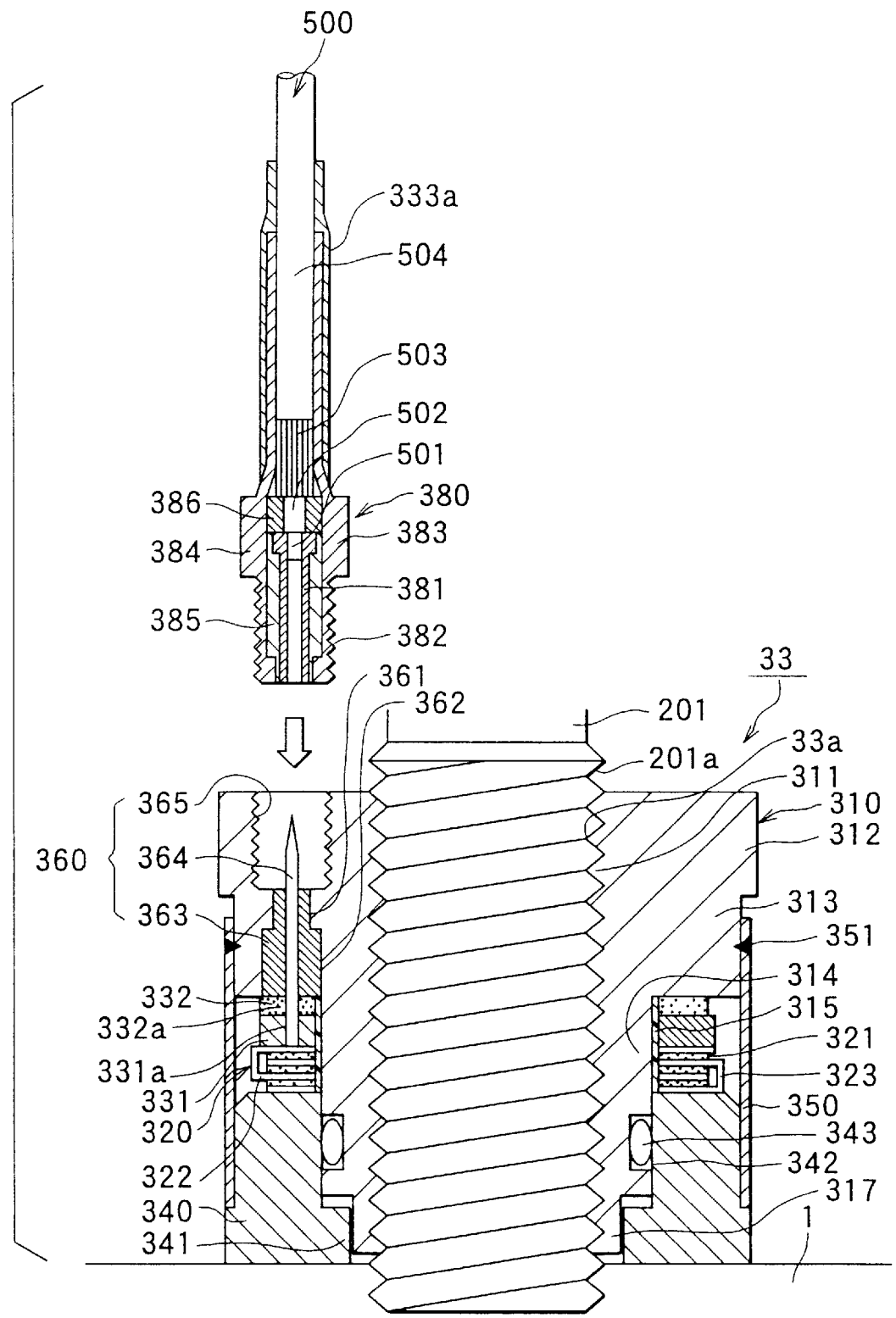
FIG. 7 is an exploded cross sectional view illustrating the detail of a combustion pressure sensor according to the present invention.

A detailed cross sectional view of the combustion pressure sensor (pressure sensor) 33 of the present embodiment is shown in FIG. 7. The combustion pressure sensor 33 is different from the combustion pressure sensor 31 shown in FIG. 3 in that the structure of the lead portion electrically connects the piezoelectric element portion 320 to the one end of the lead wire 500 is different. The different point will be mainly described herein under, and the same components shown in FIG. 7 are given the same characters shown in FIG. 3 and the description is omitted.

As shown in FIG. 7, the lead portion of the combustion pressure sensor 33 comprises a sensor body side lead portion 360 that is served as piezoelectric element portion side and a metal connector 380 that is served as lead wire side lead portion so that the lead wire 500 is detachable from the combustion pressure sensor 33.

At first, the sensor body side lead portion 360 will be described. A metal signal leading pin 364 insulation-covered with a two-step cylindrical insulation pipe consisting of fluororesin or the like is inserted into holes 361 and 362 formed on a hexagonal portion 312 of a nut 310. The one end portion of the pin 364 is exposed from the insulation pipe 363, and it is needle-shaped to be inserted into a cylindrical pressure attachment terminal 381 of the metal connector 380.

A connector attachment screw 365 (female screw) that is screw-fixable to a male screw 382 formed on the metal connector 380 is formed around the one end portion of the exposed pin 364. The rear end portion of the signal leading pin 364 is inserted into the hole 331a formed on the electrode 331 through a cut 332a formed on the insulator 332, and welded to the electrode 331 for connection.

As described hereinabove, the signal leading pin 364 is interposed between the nut 310 and a pedestal 340 with interposition of the insulation pipe 363, insulator 332, piezoelectric ceramics 321, signal leading side washer ring 322, and earth side washer ring 323. As described hereinabove, the insulation pipe 363, signal leading pin 364, and connector attachment screw 365 constitute the sensor body side lead portion 360.

On the other hand, the metal connector 380 basically comprises a lead wire 500 having a signal leading wire 501, an insulation cover 502, an earth side shield wire 503, and an insulation cover 504, a fixing metal member 384 having the above-mentioned male screw 382 and hexagonal portion 383, and the above-mentioned cylindrical pressure attachment terminal 381 disposed in the fixing metal member 384. Herein, the cylindrical pressure attachment terminal 381 is insulated from the fixing metal member 384 by means of the insulation pipe 385 consisting of fluororesin or the like and pressure-attached to the signal leading wire 501 for connection.

Furthermore, the lead wire 500 is fixedly held on the cylindrical portion of the fixing metal member 384 by caulking the insulation cover 504 that is a portion of the lead wire 500 and the earth side shield wire 503 simultaneously on the cylindrical portion of the fixing metal member 384. The earth side shield wire 503 is connected electrically to the fixing metal member 384 as the result of caulking pressure attachment, and the insulation ring 386, cylindrical pressure attachment terminal 381, and the insulation pipe 385 contained in the inside are fixed to the fixing metal member 384, and thus the metal connector comprising the lead wire 500 and the fixing metal member 384 is formed.

In the case of the lead portion of the sensor 33 comprising the above-mentioned sensor body side lead portion 360 and metal connector 380, the signal leading pin 364 is inserted into the cylindrical pressure attachment terminal 381 with screwing the connector attachment screw 365 and the male screw 382. Thereby, both components are connected electrically and fixedly held. The lead portion of the sensor 33 is formed so as to be screw-connected, the lead wire 500 is detachable from the combustion pressure sensor 33 as described hereinabove.

Therefore, components of the present embodiment are attached according to the following sequential work. The one end (heater 206 side) of the plug body 200 is inserted temporarily into the through hole 33a of the combustion pressure sensor 33 that is not attached to the lead wire 500. The plug body 200 is fixed to the engine head 1 and the combustion pressure sensor 33 is subsequently fixed to the bearing surface 1e of the engine head 1. Also, the metal connector 380 of the lead wire 500 is connected to the connector attachment screw 365 of the combustion pressure sensor 33 separately.

According to the present embodiment, because the lead wire 500 is detachable from the combustion pressure sensor 33, the lead wire 500 can be attached to the combustion pressure sensor 33 after the plug body (structure) 200 is screw-connected to the screw hole 1b of the engine as described hereinabove. Therefore, the workability is improved without adverse effect of the lead wire connected to the combustion pressure sensor when the combustion pressure sensor is formed.

Furthermore, because the lead wire 500 and connector 400 are not attached when the combustion pressure sensor 33 itself is attached, entanglement of the lead wire 500 and connector 400 (refer to FIG. 16) contained in the conventional socket wrench 910 with the plug body 200 is prevented, and breaking of the lead wire 500 is prevented. As the result, an air impact wrench can be used for attaching the sensor 33 as in the case of the plug body 200, and the workability and efficiency for attachment are improved.

Figure 8:
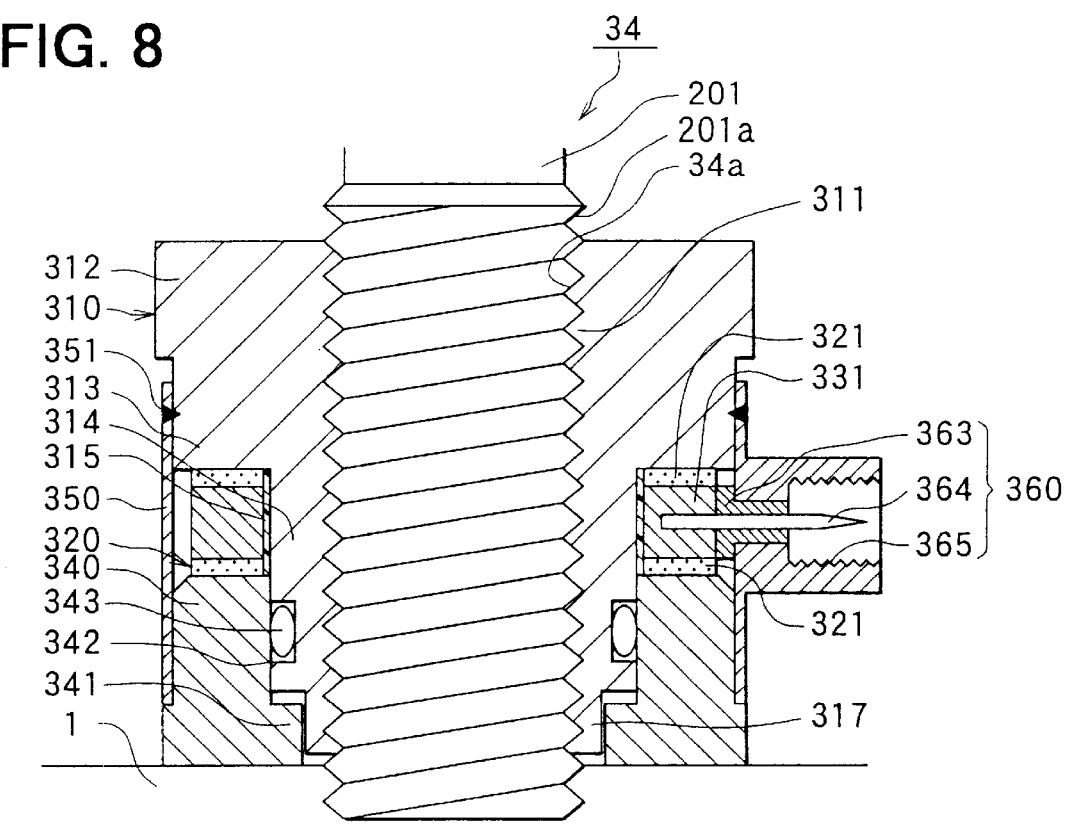
FIG. 8 is a cross sectional view illustrating a combustion pressure sensor according to the present invention.
Figure 9:
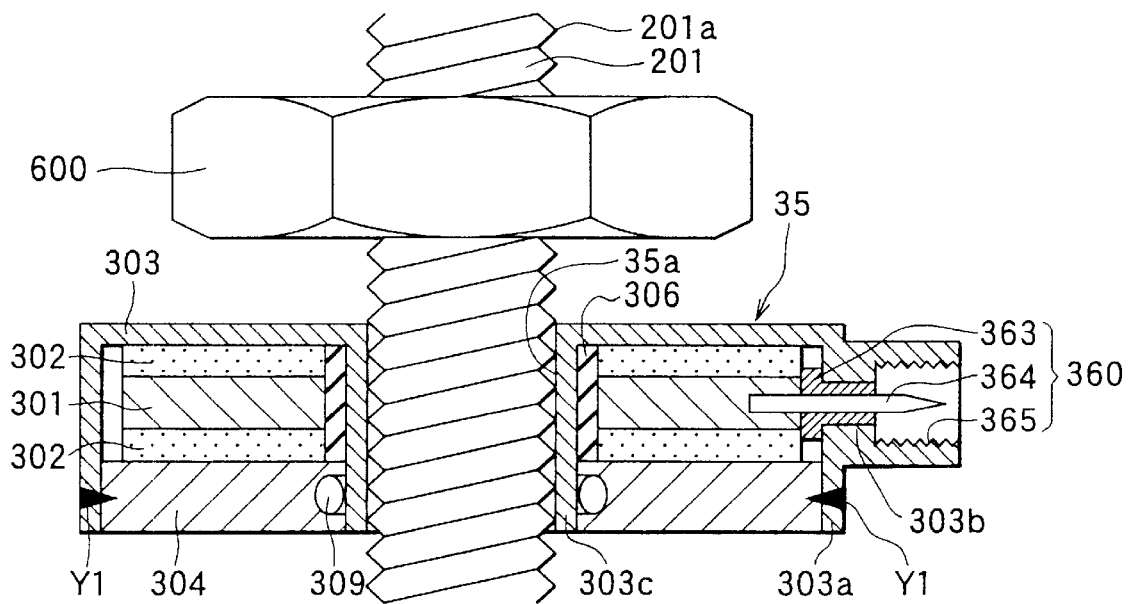
FIG. 9 is a cross sectional view illustrating a combustion pressure sensor according to the present invention.

Modified examples of the second embodiment are shown in FIG. 8 and FIG. 9. Where a combustion pressure sensor 34 shown in FIG. 8, a sensor body side lead portion 360 connected electrically to a ring-shaped piezoelectric element portion 320 comprising two piezoelectric ceramics 321 and an electrode 331 interposed between the two piezoelectric ceramics 321 is disposed in the circumferential side surface direction. Also, a metal connector 380 is attached perpendicularly to the axis of the plug body 200. The combustion pressure sensor 34 is also screw-connected to the fixing screw 201a of the plug body 200.

A combustion pressure sensor 35 shown in FIG. 9 is the combustion pressure sensor 32 shown in FIG. 5 to which the present embodiment is applied. Also, in the present embodiment, a female screw portion is not formed on the sensor 35, and a separate nut 600 having the screw function is combined. Thereby, the combustion pressure sensor 35 is fixed to the plug body 200 by the axial force of the separate nut 600 that is screw-connected to the fixing screw 201a. As the result, it is not necessary to form a screw portion on the through hole 35a of the combustion pressure sensor 35.

The detachable structure is realized by means of screw connection of the lead wire 500 to the combustion pressure sensors 33 to 35 in the second embodiment. But, the detachable structure between both components is not limited to the screw connection, and any method may be employed. For example, a projection is formed on one side and a recess or a hook corresponding to the projection is formed on the other side, and both members are hooked together.

(Third Embodiment)

The third embodiment provides a glow plug with combustion pressure sensor that is served as the combustion pressure sensor, in which a cutout portion that is formed from the periphery to the inside is formed on a combustion pressure sensor and the combustion pressure sensor is disposed so that the cutout portion is engaged with the structure.

In detail, in the glow plug with combustion pressure sensor of the present embodiment, the conventional plug body 200 shown in FIG. 14 is used and the combustion pressure sensors 36 and 37 are changed. The glow plug with combustion pressure sensor of the present embodiment is preferably used when it is difficult to miniaturize the hexagonal portion 201b of the plug body 200 as when the above-mentioned second embodiment.

Figure 10A:
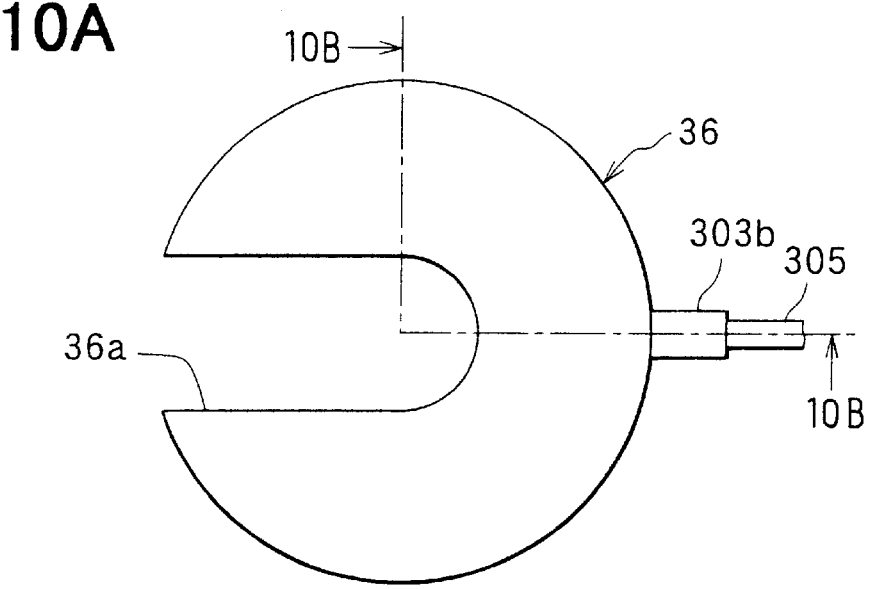
FIG. 10A is a top plan view of a combustion pressure sensor according to the present invention.
Figure 10B:
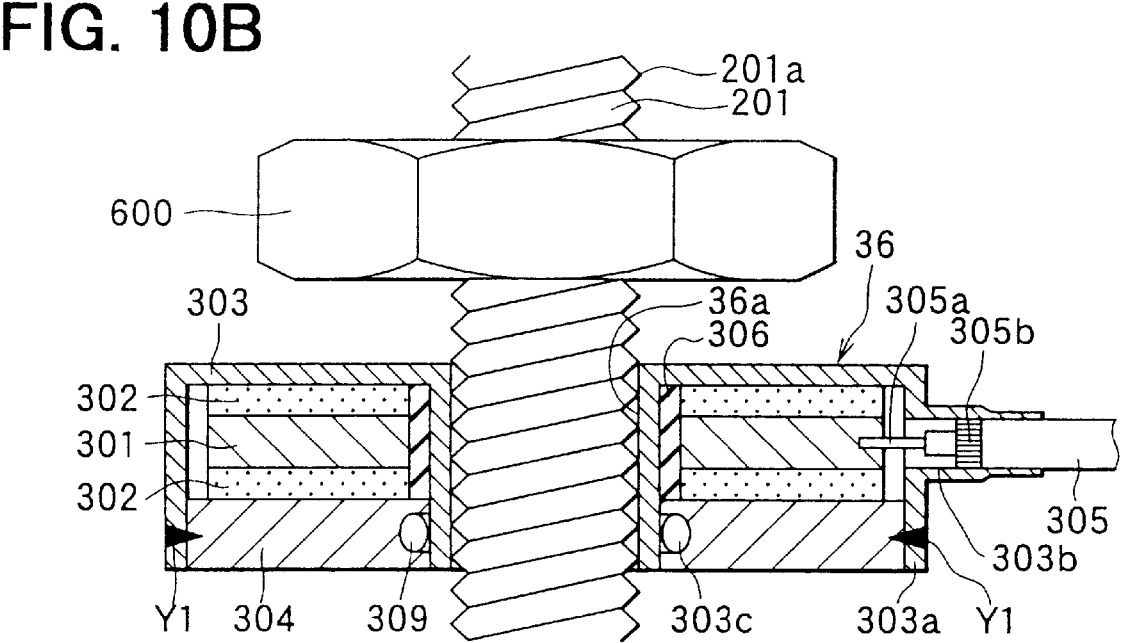
FIG. 10B is a side cross sectional view of a combustion pressure sensor according to the present invention.

FIG. 10A is a top view (plan view) of the combustion pressure sensor 36 in accordance with the present embodiment, and 10B is a cross sectional view along the line 10B—10B of 10A. This combustion pressure sensor 36 is shaped different from the approximately ring-shaped combustion pressure sensor 32 shown in FIG. 5. The same components shown in FIG. 10 are given the same characters shown in FIG. 5, and the detailed description is omitted.

The combustion pressure sensor 36 of the present embodiment has a cutout portion 36a that is formed by cutting in the form of U-shape from the circumferential side surface to the inside. Therefore, this sensor 36, the electrode 301, piezoelectric ceramics 302, metal case 303, and pedestal 304, which are all ring-shaped in FIG. 5, are cut correspondingly to the cut shape. The curve portion of U-shape of the cutout portion 36a is shaped so that the inside peripheral surface of the cutout portion 36a is in contact with the outer peripheral surface of the fixing screw 201a of the plug body 200.

The plug body 200 to which the separate nut 600 has been fitted previously is attached to the screw hole 1b, the combustion pressure sensor 36 is fitted to the plug body 200 from the open side of the cutout portion 36a in the perpendicular direction to the axis of the plug body 200, the separate nut 600 is tightened along the fixing screw 201a of the plug body 200. Thereby, the combustion pressure sensor 36 is supportingly fixed to the bearing surface 1e of the engine head 1. As described hereinabove, attachment of the glow plug with combustion pressure sensor having the combustion pressure sensor 36 to the engine head 1 is completed.

As described hereinabove, though it is necessary to attach the separate nut 600 to the plug body 200 previously in the present embodiment, the combustion pressure sensor 36 can be attached after the plug body 200 is screw-connected to the engine head 1. Therefore, the workability is improved without adverse effect of the shielded wire (lead wire) 305 connected to the combustion pressure sensor 36 when the combustion pressure sensor is formed. Furthermore, because the wire 305 is drawn from the circumferential side surface direction of the sensor 36, interference between the separate nut 600 and the wire 305 is prevented effectively.

Figure 11A:
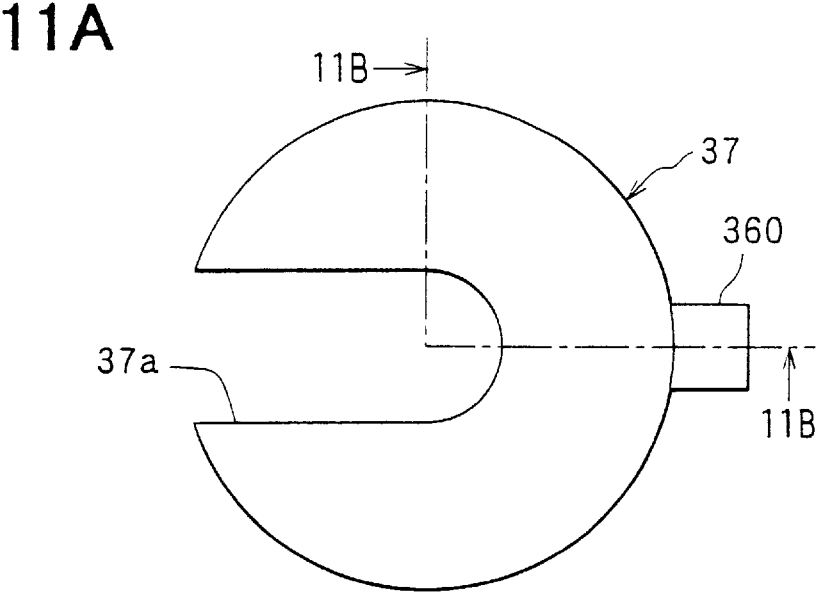
FIG. 11A is a top plan view of a combustion pressure sensor according to the present invention.
Figure 11B:
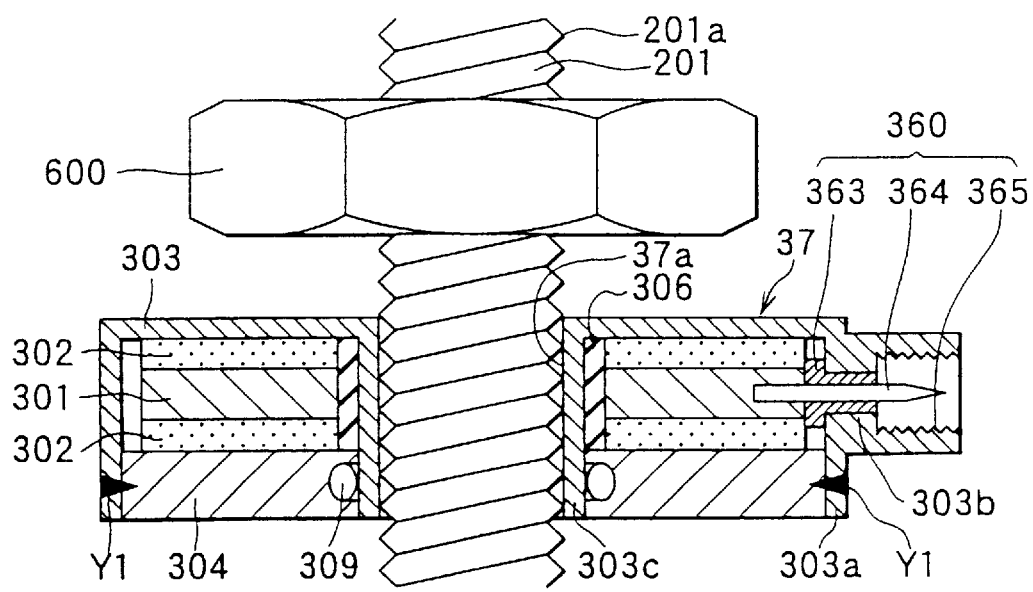
FIG. 11B is a side cross sectional view of a combustion pressure sensor according to the present invention.

The combustion pressure sensor 37 shown in FIG. 11 as the modified example of the present embodiment is the combustion pressure sensor 35 shown in FIG. 9 to which the present embodiment is applied. FIG. 11A is a top view (plan view) of the combustion pressure sensor (pressure sensor) 37, and 11B is a cross sectional view along the line 11B—11B of 11A.

In the present example, the plug body 200 to which the separate nut 600 has been fitted previously is fixed to the engine head 1, the combustion pressure sensor 37 is fitted and tightened to the plug body 200 from the open side of the cutout portion 37a, and the lead wire 500 is connected to the sensor 37 with interposition of the metal connector 380.

The shape of the cutout portions 36a and 37a of the combustion pressure sensors 36 and 37 used in the third embodiment is by no means limited to a specified shape, but any shape may be applied as long as the cutout portion can be fitted to the plug body 200 from the open side of the cutout portion in the perpendicular direction to the axis of the plug body 200.

Furthermore, though the combustion pressure sensors 36 and 37 of the present invention are fixed to the plug body 200 by tightening the separate nut 600, however, fixing is not limited to the tightening of the separate nut 600, and any method may be used. For example, the combustion pressure sensors 36 and 37 may be fixed to the engine head 1 with interposition of a separate flange member.

(Other Embodiment)

The structure described in the above-mentioned first embodiment, namely the structure in which the outside diameter of the other end including the hexagonal portion 201b out of the plug body 220 is made smaller than the inside diameter of the through hole of the combustion pressure sensor so that the plug body 220 can be inserted into the combustion pressure sensor from the other end, can be applied to the structure of the above-mentioned second embodiment and third embodiment (combustion pressure sensors 33 to 37). When the first embodiment is combined with the third embodiment, the cutout portions 36a and 37a are corresponding to the through hole of the combustion pressure sensor.

The glow plug with combustion pressure sensor is described as the combustion pressure sensor in the above-mentioned embodiment. But, the present invention may be applied to not only the glow plug with combustion pressure sensor but also a combustion pressure sensor that is screw-connected by turning the structure having the one end that has been inserted into a screw hole formed on an engine (for example, bolt, spark plug, or injector), and a combustion pressure sensor attached to the engine for detecting the combustion pressure of the engine. An example in which the present invention is applied to a spark plug 700 is shown in FIG. 12, and an example in which the present invention is applied to a bolt 800 is shown in FIG. 13.

Figure 12:
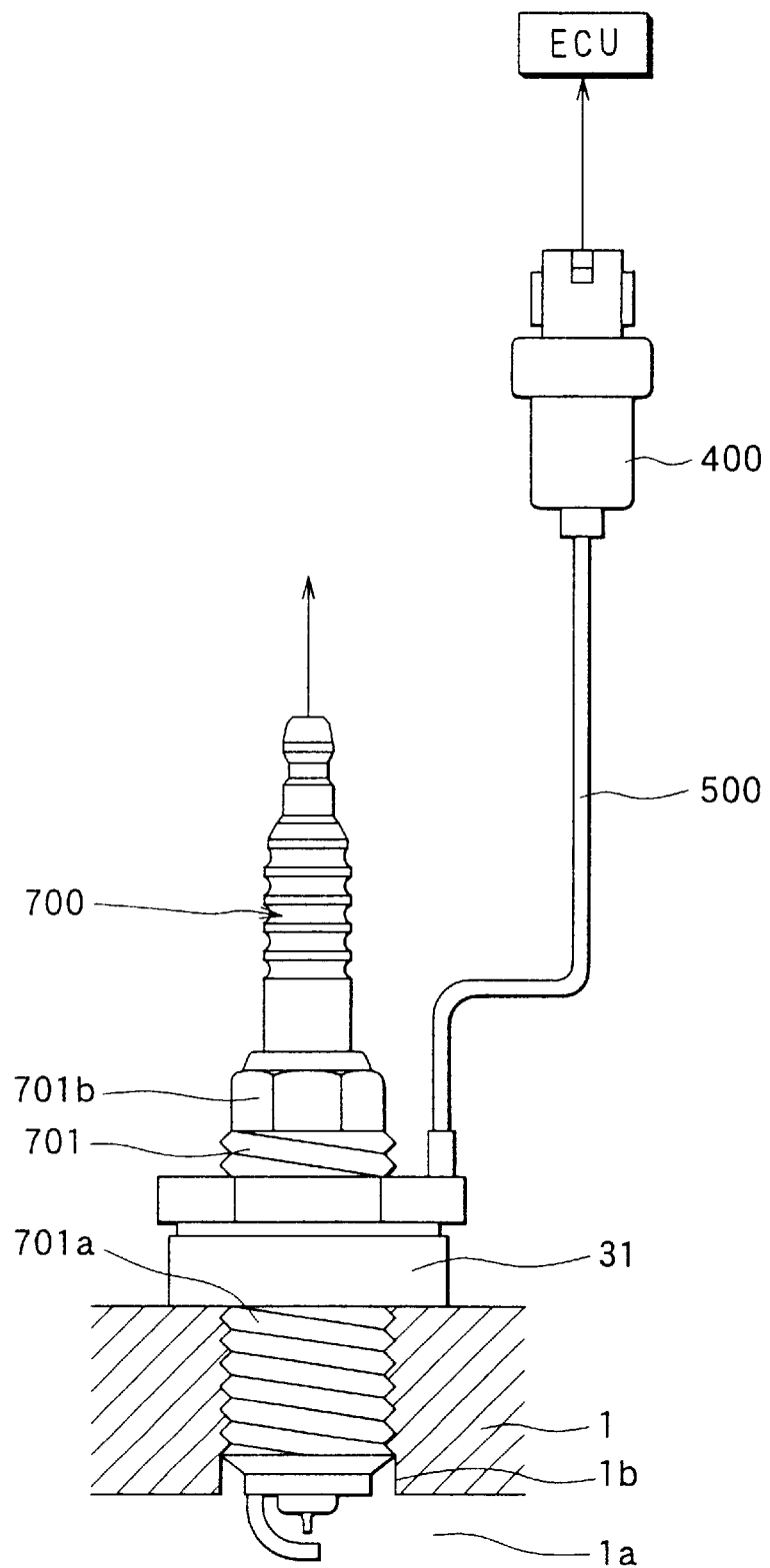
FIG. 12 is a plan view of a spark plug used in accordance with the present invention.

In FIG. 12, the spark plug (referred to as structure in the present invention) 700 is attached to a screw hole 1b of an engine head 1 of a gasoline engine by means of a fixing screw (screw portion of the structure) 701a formed on the outer peripheral surface of the housing 701. Furthermore, in FIG. 13, the bolt (referred to as the structure in the present invention) that is a member exposed into a combustion chamber 1a in an engine head 1 is attached to a screw hole 1b of the engine head 1 by means of a fixing screw (screw portion of the structure) 801a formed on the outer peripheral surface of the engine head 1.

Figure 13:
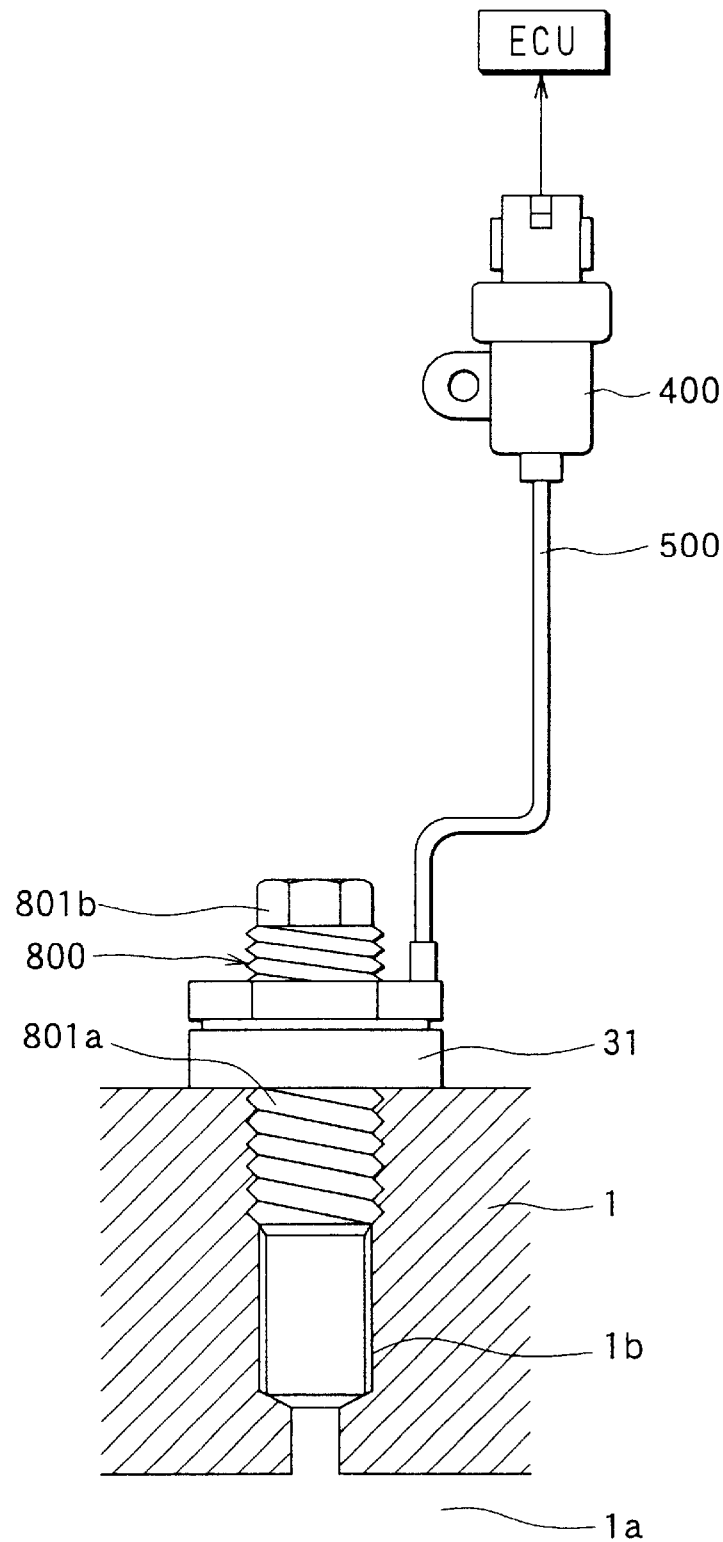
FIG. 13 is a diagram illustrating an example in which the present invention is applied to a bolt used as the structure.

In FIG. 12 and FIG. 13, the combustion pressure sensor (pressure sensor) 31 is attached to the fixing screws 701a and 801a of the respective structures 700 and 800, the force arising from the combustion pressure acting on the structures is converted to the electric signal based on the piezoelectric characteristic of the piezoelectric element 321, and the combustion pressure of the engine is detected.

In the examples shown in FIG. 12 and FIG. 13, the outside diameter of the hexagonal portions (referred to as nut portion in the present invention) 701b and 801b side of the respective structures 700 and 800 is made smaller than the inside diameter of the through hole 31a of the combustion pressure sensor 31. Thereby, the respective structures 700 and 800 are can be inserted into the through hole 31a of the combustion pressure sensor 31 from the hexagonal portion side end. As the result, the examples exhibit the same effect as obtained in the above-mentioned first embodiment. As a matter of course, the above-mentioned second and third embodiments and other embodiments can be applied to these examples. The present invention is also applied to an injector that is to be attached to an engine, though it is not shown in the drawing.

The shape of the nut portion of the present invention is by no means limited to the above-mentioned hexagonal portions 201b, 221, 701b, and 801b that are all hexagonal, but any shape such as triangle, rectangle, square, or octagon may be employed as long as the shape is sufficiently effective to give the rotational force round the axis so that the structure is screw-connected to the screw hole 1b.

While the above-described embodiments refer to examples of usage of the present invention, it is understood that the present invention may be applied to other usage, modifications and variations of the same, and is not limited to the disclosure provided herein.

What is claimed is:

1. A combustion pressure sensor assembly comprising:

a structure having a first end and a second end, said first end inserted into a screw hole formed in an engine, said structure having a screw portion that screw connects said structure to an inside peripheral surface of said screw hole, said structure having a nut portion on the second end for providing rotational force around an axis of said structure to screw connect the first end of said structure to said inside peripheral surface of said screw hole;

a combustion pressure sensor having a through hole through which the structure is inserted for detecting combustion pressure of the engine; and a lead wire that carries an outputted signal from the combustion pressure sensor to an external receiving area;

wherein the combustion pressure sensor is attached to the structure by inserting the structure into the through hole of the combustion pressure sensor to attach the combustion pressure sensor to the structure; and wherein the second end of the structure including the nut portion is smaller than an inside diameter of the through hole of the combustion pressure sensor, the structure being inserted into the through hole of the combustion pressure sensor from the second end of the structure.

2. The combustion pressure sensor assembly according to claim 1, wherein a second screw portion is formed on the inside surface of the through hole of the combustion pressure sensor, the structure is inserted into the through hole, the screw portion of the structure is screw-connected to the screw portion of the through hole to thereby fix the combustion pressure sensor to the structure.

3. The combustion pressure sensor assembly according to claim 1, wherein said structure is a glow plug or a spark plug.

4. A combustion pressure sensor assembly comprising:
   a structure with a screw portion on an outer peripheral surface having one end inserted into a screw hole formed on an engine to screw-connect the structure to the screw hole by turning the structure around an axis of the structure;
   a combustion pressure sensor attached at a middle portion along the axis of the structure, said combustion pressure sensor for detecting a combustion pressure of the engine; and
   a lead wire that transports a signal from the combustion pressure sensor to an external area; and
   wherein the lead wire is detachably connected to the combustion pressure sensor.

5. The combustion pressure sensor assembly according to claim 4, wherein the lead wire is detachably connected to the combustion pressure sensor by a screw-connection.

6. The combustion pressure sensor assembly according to claim 4, wherein;
   a through hole having a screw portion on an inside surface is formed on the combustion pressure sensor; and
   the structure is inserted into the through hole, the screw portion of the structure is screw-connected to the screw portion of the through hole to thereby fix the combustion pressure sensor to the structure.

7. The combustion pressure sensor assembly according to claim 4, wherein said structure is a glow plug or a spark plug.

8. A combustion pressure sensor assembly comprising:
   a structure with a screw portion on an outer peripheral surface of the structure, said structure having a first end inserted into a screw hole formed on an engine, said structure screw-connected to the screw hole by rotation of said structure around an axis of the structure;
   a combustion pressure sensor attached on a middle portion along the axis of the structure, said combustion pressure sensor for detecting the combustion pressure of the engine; and
   a lead wire that outputs a signal from the combustion pressure sensor to an external area; and
   wherein the combustion pressure sensor has a cutout portion formed from an outer periphery to an inside area of the combustion pressure sensor, and the cutout portion is fitted to the structure.

9. The combustion pressure sensor assembly according to claim 8, wherein the combustion pressure sensor is fixed to the structure by axial force of a separate nut, said nut being screw-connected to the screw portion of the structure.

10. The combustion pressure sensor assembly according to claim 9, wherein the lead wire is connected to the combustion pressure sensor and is arranged in a manner so that the lead wire approaches the combustion pressure sensor along a direction crossing a direction of the axial force of the separate nut.

11. The combustion pressure sensor assembly according to claim 8, wherein said structure is a glow plug or a spark plug.

12. A method for assembling a combustion pressure sensor assembly to an engine, said method comprising:
   inserting a structure having a first end and a second end into a screw hole formed in an engine;
   screwing said structure to threadingly engage said structure with said screw hole by applying rotational torque on a nut portion located at the second end of said structure; and
   positioning a combustion pressure sensor around said structure from said second end, said sensor having a through hole through which the structure is inserted;
   wherein an outer diameter including the nut portion of the second end is smaller than an inside diameter of the through hole of the combustion pressure sensor to allow said structure to be inserted into the through hole of the combustion pressure sensor from the second end of the structure.

13. The method according to claim 12, wherein said positioning step comprises threadably engaging an inside diameter of said through hole of said combustion sensor to said structure.

14. The combustion pressure sensor assembly according to claim 12, wherein said structure is a glow plug or a spark plug.

* * * * *